(12) United States Patent
Grasset

(10) Patent No.: US 9,326,016 B2
(45) Date of Patent: Apr. 26, 2016

(54) SYSTEMS AND METHODS FOR MIRRORING AND TRANSCODING MEDIA CONTENT

(75) Inventor: Jean-Francois Benjamin Grasset, Boulogne (FR)

(73) Assignee: Rovi Guides, Inc., San Carlos, CA (US)

(*) Notice: Subject to any disclaimer, the term of this patent is extended or adjusted under 35 U.S.C. 154(b) by 0 days.

(21) Appl. No.: 12/889,986

(22) Filed: Sep. 24, 2010

(65) Prior Publication Data

US 2011/0106910 A1 May 5, 2011

Related U.S. Application Data

(63) Continuation of application No. 11/827,649, filed on Jul. 11, 2007, now abandoned.

(51) Int. Cl.

| | |
|---|---|
| *H04N 21/4147* | (2011.01) |
| *H04N 21/2743* | (2011.01) |
| *G06F 11/20* | (2006.01) |
| *G06F 17/30* | (2006.01) |
| *G11B 27/034* | (2006.01) |

(Continued)

(52) U.S. Cl.
CPC ........ *H04N 21/2743* (2013.01); *G06F 11/2056* (2013.01); *G06F 11/2082* (2013.01); *G06F 17/30144* (2013.01); *G06F 17/30174* (2013.01); *G11B 27/034* (2013.01); *H04L 12/2812* (2013.01); *H04L 12/2816* (2013.01); *H04L 67/1095* (2013.01); *H04L 67/28* (2013.01); *H04L 67/2823* (2013.01); *H04N 7/17318* (2013.01); *H04N 21/2343* (2013.01); *H04N 21/4147* (2013.01); *H04N 21/41407* (2013.01); *H04N 21/4325* (2013.01); *H04N 21/64784* (2013.01); *H04L 67/325* (2013.01); *H04L 2012/2849* (2013.01)

(58) Field of Classification Search
CPC ............ H04N 21/4147; G06F 11/2056; G06F 11/2082; G06F 17/30174; G06F 17/30144
See application file for complete search history.

(56) References Cited

U.S. PATENT DOCUMENTS

| | | | |
|---|---|---|---|
| 4,287,539 | A | 9/1981 | Bixby |
| 4,355,415 | A | 10/1982 | George et al. |

(Continued)

FOREIGN PATENT DOCUMENTS

| | | |
|---|---|---|
| CA | 2635571 | 5/2009 |
| CN | 101707876 | 5/2010 |

(Continued)

OTHER PUBLICATIONS

Dimitrova, et al. "Personalizing Video Recorders ing Multimedia Processing and Integration." ACM 2001.

(Continued)

*Primary Examiner* — Robert Hance
(74) *Attorney, Agent, or Firm* — Ropes & Gray LLP

(57) ABSTRACT

Systems and methods for mirroring and transcoding media content are provided. In some embodiments, media content stored on a user equipment device is mirrored on a remote server, and the mirrored copy is transcoded and provided to other user devices in a media content format that is appropriate for the user devices. By so doing, the present invention not only provides a convenient and easy way for users to backup media content and access the media content from virtually any device, but also reduces the complexity and costs associated with maintaining reliable and consistent access to media content across various user devices.

48 Claims, 9 Drawing Sheets

(51) Int. Cl.
*H04L 12/28* (2006.01)
*H04N 7/173* (2011.01)
*H04N 21/2343* (2011.01)
*H04N 21/414* (2011.01)
*H04N 21/432* (2011.01)
*H04N 21/647* (2011.01)
*H04L 29/08* (2006.01)

(56) References Cited

U.S. PATENT DOCUMENTS

| | | |
|---|---|---|
| 4,488,179 A | 12/1984 | Kroger et al. |
| 4,602,279 A | 7/1986 | Freeman |
| 4,605,964 A | 8/1986 | Chard |
| 4,694,490 A | 9/1987 | Harvey et al. |
| 4,704,725 A | 11/1987 | Harvey et al. |
| 4,706,121 A | 11/1987 | Young |
| 4,718,107 A | 1/1988 | Hayes |
| 4,745,549 A | 5/1988 | Hashimoto |
| 4,751,578 A | 6/1988 | Reiter et al. |
| 4,787,063 A | 11/1988 | Muguet |
| 4,847,698 A | 7/1989 | Freeman |
| 4,857,999 A | 8/1989 | Welsh |
| 4,908,707 A | 3/1990 | Kinghorn |
| 4,930,158 A | 5/1990 | Vogel |
| 4,959,720 A | 9/1990 | Duffield et al. |
| 4,963,994 A | 10/1990 | Levine |
| 4,965,825 A | 10/1990 | Harvey et al. |
| 4,977,455 A | 12/1990 | Young |
| 5,027,400 A | 6/1991 | Baji et al. |
| 5,047,867 A | 9/1991 | Strubbe et al. |
| 5,109,279 A | 4/1992 | Ando |
| 5,109,414 A | 4/1992 | Harvey et al. |
| 5,134,719 A | 7/1992 | Mankovitz |
| 5,151,789 A | 9/1992 | Young |
| 5,155,591 A | 10/1992 | Wachob |
| 5,172,413 A | 12/1992 | Bradley et al. |
| 5,200,822 A | 4/1993 | Bronfin et al. |
| 5,223,924 A | 6/1993 | Stubbe |
| 5,231,493 A | 7/1993 | Apitz |
| 5,233,654 A | 8/1993 | Harvey et al. |
| 5,249,043 A | 9/1993 | Grandmougin |
| 5,253,066 A | 10/1993 | Vogel |
| 5,291,554 A | 3/1994 | Morales |
| 5,299,006 A | 3/1994 | Kim |
| 5,317,730 A | 5/1994 | Moore et al. |
| 5,335,277 A | 8/1994 | Harvey et al. |
| 5,339,434 A | 8/1994 | Rusis |
| 5,341,350 A | 8/1994 | Frank et al. |
| 5,346,326 A | 9/1994 | Bienvenu |
| 5,353,121 A | 10/1994 | Young et al. |
| 5,355,162 A | 10/1994 | Yazolino et al. |
| 5,355,302 A | 10/1994 | Martin et al. |
| 5,357,276 A | 10/1994 | Banker et al. |
| 5,400,402 A | 3/1995 | Garfinkle |
| 5,404,567 A | 4/1995 | DePietro et al. |
| 5,410,343 A | 4/1995 | Coddington et al. |
| 5,410,344 A | 4/1995 | Graves et al. |
| 5,412,720 A | 5/1995 | Hoarty |
| 5,426,699 A | 6/1995 | Wunderlich et al. |
| 5,442,389 A | 8/1995 | Blahut et al. |
| 5,442,390 A | 8/1995 | Hooper et al. |
| 5,453,779 A | 9/1995 | Dan et al. |
| 5,461,415 A | 10/1995 | Wolf et al. |
| 5,465,385 A | 11/1995 | Ohga et al. |
| 5,477,263 A | 12/1995 | O'Callaghan et al. |
| 5,479,266 A | 12/1995 | Young et al. |
| 5,479,268 A | 12/1995 | Young et al. |
| 5,479,302 A | 12/1995 | Haines |
| 5,485,197 A | 1/1996 | Hoarty |
| 5,502,504 A | 3/1996 | Marshall et al. |
| 5,506,932 A | 4/1996 | Holmes et al. |
| 5,517,254 A | 5/1996 | Monta et al. |
| 5,517,257 A | 5/1996 | Dunn et al. |
| 5,521,631 A | 5/1996 | Budow et al. |
| 5,523,794 A | 6/1996 | Mankovitz et al. |
| 5,524,195 A | 6/1996 | Clanton, III et al. |
| 5,524,271 A | 6/1996 | Hollmann et al. |
| 5,528,513 A | 6/1996 | Vaitzblit et al. |
| 5,532,773 A | 7/1996 | Shaw et al. |
| 5,534,911 A | 7/1996 | Levitan |
| 5,537,141 A | 7/1996 | Harper et al. |
| 5,539,449 A | 7/1996 | Blahut et al. |
| 5,539,880 A | 7/1996 | Lakhani |
| 5,541,638 A | 7/1996 | Story |
| 5,541,738 A | 7/1996 | Mankovitz |
| 5,548,338 A | 8/1996 | Ellis et al. |
| 5,550,576 A | 8/1996 | Klosterman |
| 5,550,825 A | 8/1996 | McMullan, Jr. et al. |
| 5,557,338 A | 9/1996 | Maze et al. |
| 5,557,724 A | 9/1996 | Sampat et al. |
| 5,558,339 A | 9/1996 | Perlman |
| 5,559,548 A | 9/1996 | Davis et al. |
| 5,559,549 A | 9/1996 | Hendricks et al. |
| 5,568,614 A | 10/1996 | Mendelson et al. |
| 5,574,778 A | 11/1996 | Ely et al. |
| 5,576,755 A | 11/1996 | Davis et al. |
| 5,583,561 A | 12/1996 | Baker et al. |
| 5,583,563 A | 12/1996 | Wanderscheid et al. |
| 5,585,838 A | 12/1996 | Lawler et al. |
| 5,585,858 A | 12/1996 | Harper et al. |
| 5,585,866 A | 12/1996 | Miller et al. |
| 5,586,264 A | 12/1996 | Belknap et al. |
| 5,589,892 A | 12/1996 | Knee et al. |
| 5,592,551 A | 1/1997 | Lett et al. |
| 5,594,509 A | 1/1997 | Florin et al. |
| 5,594,779 A | 1/1997 | Goodman |
| 5,600,364 A | 2/1997 | Hendricks et al. |
| 5,602,582 A | 2/1997 | Wanderscheid et al. |
| 5,606,642 A | 2/1997 | Stautner et al. |
| 5,610,653 A | 3/1997 | Abecassis |
| 5,616,876 A | 4/1997 | Cluts |
| 5,619,247 A | 4/1997 | Russo |
| 5,619,249 A | 4/1997 | Billock et al. |
| 5,619,274 A | 4/1997 | Roop et al. |
| 5,623,613 A | 4/1997 | Rowe et al. |
| 5,625,678 A | 4/1997 | Blomfield-Brown |
| 5,629,733 A | 5/1997 | Youman et al. |
| 5,629,867 A | 5/1997 | Goldman |
| 5,629,980 A | 5/1997 | Stefik et al. |
| 5,630,067 A | 5/1997 | Kindell et al. |
| 5,630,119 A | 5/1997 | Aristides et al. |
| 5,632,007 A | 5/1997 | Freeman |
| 5,635,987 A | 6/1997 | Park et al. |
| 5,640,484 A | 6/1997 | Mankovitz |
| 5,648,824 A | 7/1997 | Dunn et al. |
| 5,652,613 A | 7/1997 | Lazarus et al. |
| 5,654,748 A | 8/1997 | Matthews et al. |
| 5,654,886 A | 8/1997 | Zereski, Jr. et al. |
| 5,657,072 A | 8/1997 | Aristides et al. |
| 5,666,645 A | 9/1997 | Thomas et al. |
| 5,671,277 A | 9/1997 | Ikenoue et al. |
| 5,671,377 A | 9/1997 | Bleidt et al. |
| 5,675,743 A | 10/1997 | Mavity |
| 5,678,041 A | 10/1997 | Baker et al. |
| 5,682,195 A | 10/1997 | Hendricks et al. |
| 5,684,525 A | 11/1997 | Klosterman |
| 5,694,163 A | 12/1997 | Harrison |
| 5,696,765 A | 12/1997 | Safadi |
| 5,708,845 A | 1/1998 | Wistendahl et al. |
| 5,708,961 A | 1/1998 | Hylton et al. |
| 5,710,601 A | 1/1998 | Marshall et al. |
| 5,717,452 A | 2/1998 | Janin et al. |
| 5,721,815 A | 2/1998 | Ottesen et al. |
| 5,721,829 A | 2/1998 | Dunn et al. |
| 5,727,060 A | 3/1998 | Young |
| 5,732,216 A | 3/1998 | Logan et al. |
| 5,734,119 A | 3/1998 | France et al. |
| 5,742,443 A | 4/1998 | Tsao et al. |
| 5,745,710 A | 4/1998 | Clanton, III et al. |
| 5,751,282 A | 5/1998 | Girard et al. |
| 5,751,672 A | 5/1998 | Yankowski et al. |
| 5,751,883 A | 5/1998 | Ottesen |
| 5,752,159 A | 5/1998 | Faust et al. |

(56) References Cited

U.S. PATENT DOCUMENTS

| | | | |
|---|---|---|---|
| 5,752,160 | A | 5/1998 | Dunn |
| 5,754,771 | A | 5/1998 | Epperson et al. |
| 5,758,257 | A | 5/1998 | Herz et al. |
| 5,758,258 | A | 5/1998 | Shoff et al. |
| 5,758,259 | A | 5/1998 | Lawler |
| 5,760,821 | A | 6/1998 | Ellis et al. |
| 5,761,417 | A | 6/1998 | Henley et al. |
| 5,761,607 | A | 6/1998 | Gudesen et al. |
| 5,768,528 | A | 6/1998 | Stumm |
| 5,771,354 | A | 6/1998 | Crawford |
| 5,774,170 | A | 6/1998 | Hite et al. |
| 5,778,181 | A | 7/1998 | Hidary et al. |
| 5,778,182 | A | 7/1998 | Cathey et al. |
| 5,778,187 | A | 7/1998 | Monteiro et al. |
| 5,781,226 | A | 7/1998 | Sheehan |
| 5,781,227 | A | 7/1998 | Goode et al. |
| 5,781,228 | A | 7/1998 | Sposato |
| 5,790,198 | A | 8/1998 | Roop et al. |
| 5,790,423 | A | 8/1998 | Lau et al. |
| 5,793,366 | A | 8/1998 | Mano et al. |
| 5,793,412 | A | 8/1998 | Asamizuya |
| 5,793,971 | A | 8/1998 | Fujita et al. |
| 5,794,217 | A | 8/1998 | Allen |
| 5,796,952 | A | 8/1998 | Davis et al. |
| 5,798,921 | A | 8/1998 | Johnson et al. |
| 5,802,284 | A | 9/1998 | Karlton et al. |
| 5,805,154 | A | 9/1998 | Brown |
| 5,805,763 | A | 9/1998 | Lawler et al. |
| 5,805,804 | A | 9/1998 | Laursen et al. |
| 5,805,806 | A | 9/1998 | McArthur |
| 5,808,608 | A | 9/1998 | Young et al. |
| 5,808,694 | A | 9/1998 | Usui et al. |
| 5,809,204 | A | 9/1998 | Young et al. |
| 5,809,246 | A | 9/1998 | Goldman |
| 5,812,123 | A | 9/1998 | Rowe et al. |
| 5,812,205 | A | 9/1998 | Milnes et al. |
| 5,812,763 | A | 9/1998 | Teng |
| 5,815,146 | A | 9/1998 | Youden et al. |
| 5,815,297 | A | 9/1998 | Ciciora |
| 5,818,438 | A | 10/1998 | Howe et al. |
| 5,818,439 | A | 10/1998 | Nagasaka et al. |
| 5,819,019 | A | 10/1998 | Nelson |
| 5,819,160 | A | 10/1998 | Foladare et al. |
| 5,822,530 | A | 10/1998 | Brown |
| 5,828,945 | A | 10/1998 | Klosterman |
| RE35,954 | E | 11/1998 | Levine |
| 5,832,287 | A | 11/1998 | Atalla |
| 5,835,126 | A | 11/1998 | Lewis |
| 5,841,979 | A | 11/1998 | Schulhof et al. |
| 5,844,620 | A | 12/1998 | Coleman et al. |
| 5,850,218 | A | 12/1998 | LaJoie et al. |
| 5,861,906 | A | 1/1999 | Dunn et al. |
| 5,872,588 | A | 2/1999 | Ares et al. |
| 5,881,245 | A | 3/1999 | Thompson |
| 5,883,621 | A | 3/1999 | Iwamura |
| 5,884,028 | A | 3/1999 | Kindell et al. |
| 5,884,141 | A | 3/1999 | Inoue et al. |
| 5,886,707 | A | 3/1999 | Berg |
| 5,886,732 | A | 3/1999 | Humpleman |
| 5,887,243 | A | 3/1999 | Harvey et al. |
| 5,892,915 | A | 4/1999 | Duso et al. |
| 5,894,589 | A | 4/1999 | Reber et al. |
| 5,896,414 | A | 4/1999 | Meyer et al. |
| 5,898,441 | A | 4/1999 | Flurry |
| 5,898,456 | A | 4/1999 | Wahl |
| 5,899,582 | A | 5/1999 | DuLac |
| 5,900,904 | A | 5/1999 | Okada et al. |
| 5,903,234 | A | 5/1999 | Kimura |
| 5,903,263 | A | 5/1999 | Emura |
| 5,903,264 | A | 5/1999 | Moeller et al. |
| 5,903,723 | A | 5/1999 | Beck et al. |
| 5,905,522 | A | 5/1999 | Lawler |
| 5,905,847 | A | 5/1999 | Kobayashi et al. |
| 5,909,638 | A | 6/1999 | Allen |
| 5,911,046 | A | 6/1999 | Amano |
| 5,913,039 | A | 6/1999 | Nakamura et al. |
| 5,914,941 | A | 6/1999 | Janky |
| 5,915,090 | A | 6/1999 | Joseph et al. |
| 5,915,094 | A | 6/1999 | Kouloheris et al. |
| 5,916,303 | A | 6/1999 | Scott |
| 5,917,538 | A | 6/1999 | Asamizuya |
| 5,917,835 | A | 6/1999 | Barrett et al. |
| 5,920,702 | A | 7/1999 | Bleidt et al. |
| 5,920,800 | A | 7/1999 | Schafer |
| 5,922,045 | A | 7/1999 | Hanson |
| 5,922,048 | A | 7/1999 | Emura |
| 5,923,361 | A | 7/1999 | Sutton, Jr. |
| 5,926,204 | A | 7/1999 | Mayer |
| 5,926,205 | A | 7/1999 | Krause et al. |
| 5,926,624 | A | 7/1999 | Katz et al. |
| 5,928,327 | A | 7/1999 | Wang et al. |
| 5,929,850 | A | 7/1999 | Broadwin et al. |
| 5,930,473 | A | 7/1999 | Teng et al. |
| 5,930,493 | A | 7/1999 | Ottesen et al. |
| 5,931,901 | A | 8/1999 | Wolfe et al. |
| 5,933,603 | A | 8/1999 | Vahalia et al. |
| 5,933,835 | A | 8/1999 | Adams et al. |
| 5,935,206 | A | 8/1999 | Dixon et al. |
| 5,936,569 | A | 8/1999 | Stahle et al. |
| 5,936,673 | A | 8/1999 | Agarwal |
| 5,940,071 | A | 8/1999 | Treffers et al. |
| 5,940,073 | A | 8/1999 | Klosterman et al. |
| 5,943,046 | A | 8/1999 | Cave et al. |
| 5,943,047 | A | 8/1999 | Suzuki |
| 5,945,987 | A | 8/1999 | Dunn |
| 5,945,988 | A | 8/1999 | Williams et al. |
| 5,947,746 | A | 9/1999 | Tsai |
| 5,949,411 | A | 9/1999 | Doerr et al. |
| 5,949,954 | A | 9/1999 | Young et al. |
| 5,956,482 | A | 9/1999 | Aqraharam et al. |
| 5,956,716 | A | 9/1999 | Kenner et al. |
| 5,959,659 | A | 9/1999 | Dokic |
| 5,963,202 | A | 10/1999 | Polish |
| 5,964,455 | A | 10/1999 | Catanzarite et al. |
| 5,969,283 | A | 10/1999 | Looney et al. |
| 5,969,714 | A | 10/1999 | Butcher |
| 5,973,680 | A | 10/1999 | Ueda |
| 5,973,722 | A | 10/1999 | Wakai et al. |
| 5,974,217 | A | 10/1999 | Haraguchi |
| 5,977,963 | A | 11/1999 | Gaughan et al. |
| 5,977,964 | A | 11/1999 | Williams et al. |
| 5,978,567 | A | 11/1999 | Rebane et al. |
| 5,978,843 | A | 11/1999 | Wu et al. |
| 5,986,650 | A | 11/1999 | Ellis et al. |
| 5,990,881 | A | 11/1999 | Inoue et al. |
| 5,999,688 | A | 12/1999 | Iggulden et al. |
| 5,999,970 | A | 12/1999 | Krisberqh et al. |
| 6,002,394 | A | 12/1999 | Schein et al. |
| 6,002,720 | A | 12/1999 | Yurt et al. |
| 6,005,564 | A | 12/1999 | Ahmad et al. |
| 6,005,600 | A | 12/1999 | Hill |
| 6,006,257 | A | 12/1999 | Slezak |
| 6,008,802 | A | 12/1999 | Iki et al. |
| 6,009,465 | A | 12/1999 | Decker et al. |
| 6,012,089 | A | 1/2000 | Hasegawa |
| 6,012,091 | A | 1/2000 | Boyce |
| 6,014,184 | A | 1/2000 | Knee et al. |
| 6,014,381 | A | 1/2000 | Troxel et al. |
| 6,014,689 | A | 1/2000 | Budge et al. |
| 6,014,693 | A | 1/2000 | Ito et al. |
| 6,014,694 | A | 1/2000 | Aharoni et al. |
| 6,014,706 | A | 1/2000 | Cannon et al. |
| 6,018,359 | A | 1/2000 | Kemiode et al. |
| 6,018,612 | A | 1/2000 | Thomason et al. |
| 6,018,765 | A | 1/2000 | Durana et al. |
| 6,020,912 | A | 2/2000 | De Lang |
| 6,020,930 | A | 2/2000 | Legrand |
| 6,022,223 | A | 2/2000 | Taniguchi et al. |
| 6,023,725 | A | 2/2000 | Ozawa et al. |
| 6,025,837 | A | 2/2000 | Matthews, III et al. |
| 6,025,868 | A | 2/2000 | Russo |
| 6,028,600 | A | 2/2000 | Rosin et al. |
| 6,029,045 | A | 2/2000 | Picco et al. |
| 6,029,064 | A | 2/2000 | Farris et al. |

(56) References Cited

U.S. PATENT DOCUMENTS

| | | |
|---|---|---|
| 6,032,202 A | 2/2000 | Lea et al. |
| 6,038,591 A | 3/2000 | Wolfe et al. |
| 6,038,614 A | 3/2000 | Chan et al. |
| 6,049,823 A | 4/2000 | Hwang |
| 6,049,831 A | 4/2000 | Gardell et al. |
| 6,052,145 A | 4/2000 | Macrae et al. |
| 6,061,056 A | 5/2000 | Menard et al. |
| 6,064,380 A | 5/2000 | Swenson et al. |
| 6,085,236 A | 7/2000 | Lea |
| 6,091,823 A | 7/2000 | Hosomi et al. |
| 6,091,883 A | 7/2000 | Artigalas et al. |
| 6,098,082 A | 8/2000 | Gibbon et al. |
| 6,111,677 A | 8/2000 | Shintani et al. |
| 6,112,181 A | 8/2000 | Shear et al. |
| 6,118,450 A | 9/2000 | Proehl et al. |
| 6,119,144 A | 9/2000 | Fujita et al. |
| 6,125,230 A | 9/2000 | Yaginuma et al. |
| 6,141,488 A | 10/2000 | Knudson et al. |
| 6,147,715 A | 11/2000 | Yuen et al. |
| 6,154,203 A | 11/2000 | Yuen et al. |
| 6,154,206 A | 11/2000 | Ludtke |
| 6,160,546 A | 12/2000 | Thompson et al. |
| 6,160,796 A | 12/2000 | Zou |
| 6,163,316 A | 12/2000 | Killian |
| 6,166,730 A | 12/2000 | Goode et al. |
| 6,167,188 A | 12/2000 | Young et al. |
| 6,169,725 B1 | 1/2001 | Gibbs et al. |
| 6,170,006 B1 | 1/2001 | Namba |
| 6,172,712 B1 | 1/2001 | Beard |
| 6,177,931 B1 | 1/2001 | Alexander et al. |
| 6,181,867 B1 | 1/2001 | Kenner et al. |
| 6,182,094 B1 | 1/2001 | Humpleman et al. |
| 6,184,878 B1 | 2/2001 | Alonso et al. |
| 6,185,621 B1 | 2/2001 | Romine |
| 6,208,335 B1 | 3/2001 | Gordon et al. |
| 6,208,341 B1 | 3/2001 | van Ee et al. |
| 6,219,839 B1 | 4/2001 | Sampsell |
| 6,230,200 B1 | 5/2001 | Forecast et al. |
| 6,230,325 B1 | 5/2001 | Linuma et al. |
| 6,232,539 B1 | 5/2001 | Looney et al. |
| 6,236,395 B1 | 5/2001 | Sezan et al. |
| 6,237,049 B1 | 5/2001 | Ludtke |
| 6,239,794 B1 | 5/2001 | Yuen et al. |
| 6,243,707 B1 | 6/2001 | Humpleman et al. |
| 6,243,725 B1 | 6/2001 | Hempleman et al. |
| 6,243,865 B1 | 6/2001 | Wei et al. |
| 6,263,503 B1 | 7/2001 | Margulis |
| 6,285,685 B1 | 9/2001 | Bum |
| 6,289,165 B1 | 9/2001 | Abecassis |
| 6,289,346 B1 | 9/2001 | Milewski et al. |
| 6,311,011 B1 | 10/2001 | Kuroda |
| 6,314,575 B1 | 11/2001 | Billock et al. |
| 6,324,338 B1 | 11/2001 | Wood et al. |
| 6,349,410 B1 | 2/2002 | Lortz |
| 6,353,700 B1 | 3/2002 | Zhou |
| 6,356,971 B1 | 3/2002 | Katz et al. |
| 6,359,661 B1 | 3/2002 | Nickum |
| 6,388,714 B1 | 5/2002 | Schein et al. |
| 6,393,430 B1 | 5/2002 | Van Ryzin |
| 6,401,242 B1 | 6/2002 | Eyer et al. |
| 6,433,835 B1 | 8/2002 | Hartson et al. |
| 6,441,832 B1 | 8/2002 | Tao et al. |
| 6,449,767 B1 | 9/2002 | Krapf et al. |
| 6,456,621 B1 | 9/2002 | Wada et al. |
| RE37,881 E | 10/2002 | Haines |
| 6,466,080 B2 | 10/2002 | Kawai et al. |
| 6,473,559 B1 | 10/2002 | Knudson et al. |
| 6,480,667 B1 | 11/2002 | O'Connor |
| 6,483,986 B1 | 11/2002 | Krapf |
| 6,487,145 B1 | 11/2002 | Berhan |
| 6,487,362 B1 | 11/2002 | Yuen et al. |
| 6,496,981 B1 | 12/2002 | Wistendahl et al. |
| 6,498,895 B2 | 12/2002 | Young et al. |
| 6,505,348 B1 | 1/2003 | Knowles et al. |
| 6,526,575 B1 | 2/2003 | McCoy et al. |
| 6,539,548 B1 | 3/2003 | Hendricks et al. |
| 6,543,053 B1 | 4/2003 | Li et al. |
| 6,564,378 B1 | 5/2003 | Satterfield et al. |
| 6,577,735 B1 | 6/2003 | Bharat |
| 6,578,070 B1 | 6/2003 | Weaver et al. |
| 6,594,699 B1 | 7/2003 | Sahai et al. |
| 6,630,954 B1 | 10/2003 | Okada |
| 6,647,417 B1 | 11/2003 | Hunter et al. |
| 6,654,933 B1 | 11/2003 | Abbott et al. |
| 6,657,116 B1 | 12/2003 | Gunnerson |
| 6,671,882 B1 | 12/2003 | Murphy et al. |
| 6,678,737 B1 | 1/2004 | Bucher |
| 6,711,622 B1 | 3/2004 | Fuller et al. |
| 6,741,617 B2 | 5/2004 | Rosengren et al. |
| 6,745,391 B1 | 6/2004 | Macrae et al. |
| 6,746,127 B2 | 6/2004 | Suyama |
| 6,751,402 B1 | 6/2004 | Elliott et al. |
| 6,751,802 B1 | 6/2004 | Huizer et al. |
| 6,756,997 B1 | 6/2004 | Ward, III et al. |
| 6,760,758 B1 | 7/2004 | Lund et al. |
| 6,769,127 B1 | 7/2004 | Bonomi et al. |
| 6,788,882 B1 | 9/2004 | Geer et al. |
| 6,813,775 B1 | 11/2004 | Finseth et al. |
| 6,816,175 B1 | 11/2004 | Hamp et al. |
| 6,816,904 B1 | 11/2004 | Ludwig et al. |
| 6,820,278 B1 | 11/2004 | Ellis |
| 6,826,512 B2 | 11/2004 | Dara-Abrams et al. |
| 6,837,789 B2 | 1/2005 | Garahi et al. |
| 6,839,769 B2 | 1/2005 | Needham et al. |
| 6,850,693 B2 | 2/2005 | Young et al. |
| 6,868,225 B1 | 3/2005 | Brown et al. |
| 6,882,793 B1 | 4/2005 | Fu et al. |
| 6,901,603 B2 | 5/2005 | Ziedler et al. |
| 6,925,246 B1 | 8/2005 | Behl |
| 6,931,593 B1 | 8/2005 | Grooters |
| 6,934,964 B1 | 8/2005 | Schaffer et al. |
| 6,938,101 B2 | 8/2005 | Hayes et al. |
| 6,973,474 B2 | 12/2005 | Hatayama |
| 6,993,788 B1 | 1/2006 | Lawrence et al. |
| 7,035,804 B2 | 4/2006 | Saindon et al. |
| 7,039,643 B2 | 5/2006 | Sena et al. |
| 7,047,377 B2 * | 5/2006 | Elder .................. G06F 11/2071 707/999.202 |
| 7,058,635 B1 | 6/2006 | Shah-Nazaroff et al. |
| 7,086,077 B2 | 8/2006 | Giammaressi |
| 7,098,958 B2 | 8/2006 | Wredenhagen et al. |
| 7,103,906 B1 | 9/2006 | Katz |
| 7,117,519 B1 | 10/2006 | Anderson et al. |
| 7,120,925 B2 | 10/2006 | D'Souza et al. |
| 7,127,735 B1 | 10/2006 | Lee |
| 7,143,432 B1 * | 11/2006 | Brooks .......... H04N 21/234363 370/437 |
| 7,159,232 B1 | 1/2007 | Blackketter et al. |
| 7,159,235 B2 | 1/2007 | Son et al. |
| 7,165,098 B1 | 1/2007 | Boyer et al. |
| 7,168,086 B1 | 1/2007 | Carpenter et al. |
| 7,171,677 B1 | 1/2007 | Ochiai |
| 7,178,161 B1 | 2/2007 | Fristoe et al. |
| 7,213,071 B2 | 5/2007 | DeLima et al. |
| 7,225,336 B2 | 5/2007 | Zunke |
| 7,231,175 B2 | 6/2007 | Ellis |
| 7,237,253 B1 | 6/2007 | Blackketter et al. |
| 7,240,356 B2 | 7/2007 | Iki et al. |
| 7,242,324 B2 | 7/2007 | Lai et al. |
| 7,248,778 B1 | 7/2007 | Anderson et al. |
| 7,260,461 B2 | 8/2007 | Rao et al. |
| 7,263,709 B1 | 8/2007 | Krapf |
| 7,269,733 B1 * | 9/2007 | O'Toole, Jr. ........... G06Q 10/06 705/75 |
| 7,272,298 B1 | 9/2007 | Lang et al. |
| 7,292,774 B1 | 11/2007 | Masters et al. |
| 7,302,697 B1 | 11/2007 | Wilson et al. |
| 7,305,254 B2 | 12/2007 | Findikli |
| 7,356,246 B1 | 4/2008 | Kobb |
| 7,356,829 B1 | 4/2008 | Terakado et al. |
| 7,366,199 B1 | 4/2008 | Vaughan et al. |
| 7,480,721 B2 | 1/2009 | Shaheen |
| 7,483,964 B1 | 1/2009 | Jackson et al. |
| 7,533,400 B1 | 5/2009 | Hailey et al. |

(56) References Cited

U.S. PATENT DOCUMENTS

| | | | |
|---|---|---|---|
| 7,536,704 B2 | 5/2009 | Pierre et al. | |
| 7,574,723 B2 | 8/2009 | Putterman et al. | |
| 7,624,345 B2 | 11/2009 | Nishina et al. | |
| 7,650,621 B2 | 1/2010 | Thomas et al. | |
| 7,684,673 B2 | 3/2010 | Monroe | |
| 7,689,510 B2 | 3/2010 | Lamkin et al. | |
| 7,761,892 B2 | 7/2010 | Ellis et al. | |
| 7,787,010 B2 | 8/2010 | DiFrancesco | |
| 7,793,326 B2* | 9/2010 | McCoskey | H04N 7/17318 |
| | | | 725/53 |
| 7,840,977 B2 | 11/2010 | Walker | |
| 7,877,766 B1 | 1/2011 | Wu et al. | |
| 7,917,933 B2 | 3/2011 | Thomas et al. | |
| 7,929,551 B2 | 4/2011 | Dietrich | |
| 8,082,568 B2 | 12/2011 | Ellis et al. | |
| 8,086,575 B2 | 12/2011 | Putterman et al. | |
| 8,295,674 B2 | 10/2012 | Sasaki et al. | |
| 8,528,032 B2 | 9/2013 | Ellis et al. | |
| 8,607,287 B2 | 12/2013 | Walker | |
| 8,719,090 B2 | 5/2014 | Lewis | |
| 8,732,757 B2 | 5/2014 | Ward et al. | |
| 2001/0004338 A1 | 6/2001 | Yankowski | |
| 2001/0007147 A1 | 7/2001 | Goldschmidt Iki et al. | |
| 2001/0026287 A1 | 10/2001 | Watanabe | |
| 2001/0033343 A1 | 10/2001 | Yap et al. | |
| 2001/0039660 A1 | 11/2001 | Vasilevsky | |
| 2001/0042107 A1 | 11/2001 | Palm | |
| 2002/0005792 A1 | 1/2002 | Satoh | |
| 2002/0010652 A1 | 1/2002 | Deguchi | |
| 2002/0026639 A1 | 2/2002 | Haneda | |
| 2002/0042914 A1 | 4/2002 | Walker et al. | |
| 2002/0043700 A1 | 4/2002 | Sasaki et al. | |
| 2002/0046315 A1 | 4/2002 | Miller et al. | |
| 2002/0056087 A1 | 5/2002 | Berezowski et al. | |
| 2002/0059588 A1 | 5/2002 | Huber et al. | |
| 2002/0059621 A1 | 5/2002 | Thomas et al. | |
| 2002/0059642 A1 | 5/2002 | Russ et al. | |
| 2002/0069218 A1 | 6/2002 | Sull et al. | |
| 2002/0069746 A1 | 6/2002 | Taira et al. | |
| 2002/0070982 A1 | 6/2002 | Hill et al. | |
| 2002/0078293 A1 | 6/2002 | Kou et al. | |
| 2002/0082901 A1 | 6/2002 | Dunning et al. | |
| 2002/0087588 A1* | 7/2002 | McBride | G06F 11/1464 |
| 2002/0088011 A1 | 7/2002 | Lamkin et al. | |
| 2002/0104091 A1 | 8/2002 | Prabhu et al. | |
| 2002/0113824 A1 | 8/2002 | Myers, Jr. | |
| 2002/0116533 A1 | 8/2002 | Holliman et al. | |
| 2002/0120935 A1 | 8/2002 | Huber et al. | |
| 2002/0124254 A1 | 9/2002 | Kikinis | |
| 2002/0166123 A1 | 11/2002 | Schrader et al. | |
| 2002/0174430 A1 | 11/2002 | Ellis et al. | |
| 2002/0174444 A1 | 11/2002 | Gatto et al. | |
| 2002/0180803 A1 | 12/2002 | Kaplan et al. | |
| 2002/0188735 A1 | 12/2002 | Needham et al. | |
| 2002/0194011 A1 | 12/2002 | Boies et al. | |
| 2003/0005446 A1 | 1/2003 | Jaff et al. | |
| 2003/0005454 A1 | 1/2003 | Rodriguez et al. | |
| 2003/0035404 A1 | 2/2003 | Ozluturk et al. | |
| 2003/0037068 A1 | 2/2003 | Thomas et al. | |
| 2003/0046437 A1 | 3/2003 | Eytchison et al. | |
| 2003/0066084 A1 | 4/2003 | Kaars | |
| 2003/0066092 A1 | 4/2003 | Wagner | |
| 2003/0068154 A1 | 4/2003 | Zylka | |
| 2003/0101104 A1 | 5/2003 | Dimitrova et al. | |
| 2003/0105813 A1 | 6/2003 | Mizutani | |
| 2003/0110499 A1 | 6/2003 | Knudson et al. | |
| 2003/0135860 A1 | 7/2003 | Dureau | |
| 2003/0149980 A1 | 8/2003 | Ellis | |
| 2003/0149988 A1 | 8/2003 | Ellis et al. | |
| 2003/0152096 A1 | 8/2003 | Chapman | |
| 2003/0162096 A1 | 8/2003 | Michot et al. | |
| 2003/0163832 A1* | 8/2003 | Tsuria | H04N 5/76 |
| | | | 725/135 |
| 2003/0187984 A1* | 10/2003 | Banavar | H04L 29/06 |
| | | | 709/225 |
| 2003/0194260 A1 | 10/2003 | Ward et al. | |
| 2003/0206710 A1 | 11/2003 | Ferman et al. | |
| 2003/0214955 A1 | 11/2003 | Kim | |
| 2004/0008971 A1 | 1/2004 | Young et al. | |
| 2004/0008972 A1 | 1/2004 | Haken | |
| 2004/0088731 A1 | 5/2004 | Putterman et al. | |
| 2004/0117831 A1 | 6/2004 | Ellis et al. | |
| 2004/0128686 A1 | 7/2004 | Boyer et al. | |
| 2004/0139233 A1 | 7/2004 | Kellerman et al. | |
| 2004/0156614 A1 | 8/2004 | Bumgardner et al. | |
| 2004/0181814 A1 | 9/2004 | Ellis et al. | |
| 2004/0184763 A1 | 9/2004 | DiFrancesco | |
| 2004/0193648 A1* | 9/2004 | Lai | H04N 7/17318 |
| 2004/0220091 A1 | 11/2004 | Adam et al. | |
| 2004/0226034 A1 | 11/2004 | Kaczowka et al. | |
| 2004/0237104 A1 | 11/2004 | Cooper et al. | |
| 2004/0255326 A1 | 12/2004 | Hicks, III et al. | |
| 2004/0259537 A1 | 12/2004 | Ackley | |
| 2004/0261040 A1 | 12/2004 | Radcliffe et al. | |
| 2004/0267965 A1 | 12/2004 | Vasudevan et al. | |
| 2005/0014531 A1 | 1/2005 | Findikli | |
| 2005/0028208 A1 | 2/2005 | Ellis et al. | |
| 2005/0039208 A1 | 2/2005 | Veeck | |
| 2005/0044567 A1 | 2/2005 | Young et al. | |
| 2005/0046174 A1 | 3/2005 | Botes | |
| 2005/0071876 A1 | 3/2005 | van Beek | |
| 2005/0080497 A1 | 4/2005 | Rao | |
| 2005/0102324 A1 | 5/2005 | Spring et al. | |
| 2005/0120373 A1 | 6/2005 | Thomas et al. | |
| 2005/0132264 A1 | 6/2005 | Joshi et al. | |
| 2005/0138137 A1 | 6/2005 | Encarnacion et al. | |
| 2005/0138658 A1 | 6/2005 | Bryan | |
| 2005/0204388 A1 | 9/2005 | Knudson et al. | |
| 2005/0204393 A1 | 9/2005 | Bopardikar et al. | |
| 2005/0227611 A1 | 10/2005 | Ellis | |
| 2005/0246393 A1 | 11/2005 | Coates et al. | |
| 2005/0251827 A1 | 11/2005 | Ellis et al. | |
| 2005/0254524 A1 | 11/2005 | An | |
| 2005/0265395 A1 | 12/2005 | Kim et al. | |
| 2006/0004685 A1 | 1/2006 | Pyhalammi et al. | |
| 2006/0015888 A1 | 1/2006 | Shih | |
| 2006/0031883 A1 | 2/2006 | Ellis et al. | |
| 2006/0037054 A1 | 2/2006 | McDowell et al. | |
| 2006/0041893 A1* | 2/2006 | Castro | H04L 67/02 |
| | | | 719/320 |
| 2006/0064728 A1 | 3/2006 | Son et al. | |
| 2006/0080707 A1 | 4/2006 | Laksono | |
| 2006/0085835 A1 | 4/2006 | Istvan et al. | |
| 2006/0090186 A1 | 4/2006 | Santangelo et al. | |
| 2006/0095942 A1 | 5/2006 | van Beek | |
| 2006/0173838 A1 | 8/2006 | Garg et al. | |
| 2006/0215650 A1 | 9/2006 | Wollmershauser et al. | |
| 2006/0238648 A1 | 10/2006 | Wogsberg | |
| 2006/0248570 A1 | 11/2006 | Witwer | |
| 2006/0253874 A1 | 11/2006 | Stark et al. | |
| 2006/0259949 A1 | 11/2006 | Schaefer et al. | |
| 2006/0271953 A1 | 11/2006 | Jacoby et al. | |
| 2007/0011709 A1 | 1/2007 | Katz | |
| 2007/0022442 A1 | 1/2007 | Gil et al. | |
| 2007/0028267 A1 | 2/2007 | Ostojic et al. | |
| 2007/0032225 A1* | 2/2007 | Konicek | H04M 1/72513 |
| | | | 455/417 |
| 2007/0055980 A1 | 3/2007 | Megeid et al. | |
| 2007/0089160 A1 | 4/2007 | Ando | |
| 2007/0094702 A1 | 4/2007 | Khare et al. | |
| 2007/0113246 A1 | 5/2007 | Xiong | |
| 2007/0124781 A1 | 5/2007 | Casey et al. | |
| 2007/0147351 A1 | 6/2007 | Dietrich et al. | |
| 2007/0157234 A1 | 7/2007 | Walker | |
| 2007/0157240 A1 | 7/2007 | Walker | |
| 2007/0157241 A1 | 7/2007 | Walker | |
| 2007/0157242 A1 | 7/2007 | Cordray et al. | |
| 2007/0157260 A1 | 7/2007 | Walker | |
| 2007/0157266 A1 | 7/2007 | Ellis et al. | |
| 2007/0157281 A1 | 7/2007 | Ellis et al. | |
| 2007/0162661 A1 | 7/2007 | Fu et al. | |
| 2007/0169149 A1 | 7/2007 | Jennings et al. | |
| 2007/0174774 A1 | 7/2007 | Lerman et al. | |

(56) References Cited

U.S. PATENT DOCUMENTS

| | | | |
|---|---|---|---|
| 2007/0198659 A1* | 8/2007 | Lam | G06F 11/1451 709/219 |
| 2007/0220024 A1 | 9/2007 | Putterman et al. | |
| 2007/0220580 A1 | 9/2007 | Putterman | |
| 2007/0282969 A1 | 12/2007 | Dietrich et al. | |
| 2007/0283046 A1 | 12/2007 | Dietrich | |
| 2008/0034396 A1* | 2/2008 | Lev | H04N 7/147 725/118 |
| 2008/0060001 A1 | 3/2008 | Logan et al. | |
| 2008/0141303 A1 | 6/2008 | Walker et al. | |
| 2008/0155615 A1* | 6/2008 | Craner | H04N 5/765 725/91 |
| 2008/0189440 A1* | 8/2008 | Goyal | H04L 67/1095 709/248 |
| 2008/0263227 A1* | 10/2008 | Roberts | H04L 67/1095 709/248 |
| 2008/0307477 A1 | 12/2008 | Omerick | |
| 2009/0138922 A1 | 5/2009 | Thomas et al. | |
| 2010/0186034 A1 | 7/2010 | Walker | |
| 2011/0131607 A1 | 6/2011 | Thomas | |
| 2011/0185392 A1 | 7/2011 | Walker | |
| 2012/0008917 A1 | 1/2012 | Katz et al. | |
| 2012/0011226 A1 | 1/2012 | Katz et al. | |
| 2012/0131218 A1 | 5/2012 | Putterman et al. | |
| 2014/0040938 A1 | 2/2014 | Thomas et al. | |

FOREIGN PATENT DOCUMENTS

| | | |
|---|---|---|
| EP | 0 424 469 | 5/1991 |
| EP | 2 256 115 | 11/1992 |
| EP | 0 535 749 | 4/1993 |
| EP | 0 572 090 | 12/1993 |
| EP | 0 605 115 | 7/1994 |
| EP | 0 624 039 | 11/1994 |
| EP | 0 662 771 | 7/1995 |
| EP | 0 673 160 | 9/1995 |
| EP | 0 682 452 | 11/1995 |
| EP | 0 711 076 | 5/1996 |
| EP | 0 725 539 | 8/1996 |
| EP | 0 753 964 | 1/1997 |
| EP | 0753964 | 1/1997 |
| EP | 0 758 833 | 2/1997 |
| EP | 0 762 756 | 3/1997 |
| EP | 0 763 938 | 3/1997 |
| EP | 0762756 | 3/1997 |
| EP | 0 862 833 | 5/1997 |
| EP | 0 836 321 | 4/1998 |
| EP | 0 854 645 | 7/1998 |
| EP | 0 673 160 | 8/1998 |
| EP | 0 874 524 | 10/1998 |
| EP | 0 924 927 | 6/1999 |
| EP | 932275 | 7/1999 |
| EP | 0 944 253 | 9/1999 |
| EP | 0 944 257 | 9/1999 |
| EP | 0940985 | 9/1999 |
| EP | 0 986 046 | 3/2000 |
| EP | 0 821 856 | 6/2001 |
| EP | 0 806 111 | 10/2001 |
| EP | 1 217 787 | 6/2002 |
| EP | 1217787 | 6/2002 |
| EP | 1 237 372 | 9/2002 |
| EP | 1427148 | 6/2004 |
| EP | 0 757 873 | 3/2006 |
| EP | 1 427 148 | 6/2006 |
| EP | 1427148 | 6/2006 |
| EP | 1 377 049 | 8/2006 |
| EP | 1377049 | 8/2006 |
| EP | 1796 393 | 6/2007 |
| EP | 1796393 | 6/2007 |
| EP | 2174484 | 4/2010 |
| GB | 2256115 | 11/1992 |
| JP | 60-061935 | 9/1985 |
| JP | 06111413 | 4/1994 |
| JP | 06303541 | 10/1994 |
| JP | 07-336318 | 12/1995 |
| JP | 08-317331 | 11/1996 |
| JP | 09 138804 | 5/1997 |
| JP | 09-182035 | 7/1997 |
| JP | 09-214873 | 8/1997 |
| JP | 10 065978 | 3/1998 |
| JP | 11 032272 | 2/1999 |
| JP | 11-177962 | 7/1999 |
| JP | 11 205711 | 7/1999 |
| JP | 11-341040 | 12/1999 |
| JP | H11-341040 | 12/1999 |
| JP | 2000-004272 | 1/2000 |
| JP | 2001-204001 | 7/2001 |
| JP | 2002-063385 | 2/2002 |
| JP | 2002-176610 | 6/2002 |
| JP | 2003-162444 | 6/2003 |
| JP | 2003-518832 | 6/2003 |
| JP | 2003-209893 | 7/2003 |
| JP | 2004-080083 | 3/2004 |
| JP | 2005-117236 | 4/2005 |
| JP | 2006-088052 | 3/2006 |
| KR | 1999-0086454 | 12/1999 |
| KR | 2000-0059522 | 10/2000 |
| KR | 2005-0108181 | 11/2005 |
| KR | 2005-0113493 | 12/2005 |
| RO | C 247388 | 10/1994 |
| WO | WO-88/04507 | 6/1988 |
| WO | WO 89/12370 | 12/1989 |
| WO | WO 90/00847 | 1/1990 |
| WO | WO 91/00670 | 1/1991 |
| WO | WO 91/07050 | 5/1991 |
| WO | WO 92/04801 | 3/1992 |
| WO | WO 9222983 | 12/1992 |
| WO | WO 93/08542 | 4/1993 |
| WO | WO 93/22877 | 11/1993 |
| WO | WO 95/01058 | 1/1995 |
| WO | WO-95/04431 | 2/1995 |
| WO | WO 95/15658 | 6/1995 |
| WO | WO 95/31069 | 11/1995 |
| WO | WO 95/32583 | 11/1995 |
| WO | WO 95/32584 | 11/1995 |
| WO | WO 95/32585 | 11/1995 |
| WO | WO 95/32587 | 11/1995 |
| WO | WO 96/09721 | 3/1996 |
| WO | WO 96/17467 | 6/1996 |
| WO | WO 96/25821 | 8/1996 |
| WO | WO-96/31980 | 10/1996 |
| WO | WO 96/33572 | 10/1996 |
| WO | WO 96/34467 | 10/1996 |
| WO | WO-96/34491 | 10/1996 |
| WO | WO 96/41472 | 12/1996 |
| WO | WO-96/41478 | 12/1996 |
| WO | WO-97/13368 | 4/1997 |
| WO | WO 9719555 | 5/1997 |
| WO | WO 97/21291 | 6/1997 |
| WO | WO 97/32434 | 9/1997 |
| WO | WO 97/34413 | 9/1997 |
| WO | WO 97/34414 | 9/1997 |
| WO | WO 97/37500 | 10/1997 |
| WO | WO-97/40623 | 10/1997 |
| WO | WO 97/42763 | 11/1997 |
| WO | WO 97/46016 | 12/1997 |
| WO | WO-97/46943 | 12/1997 |
| WO | WO-97/47124 | 12/1997 |
| WO | WO 97/48228 | 12/1997 |
| WO | WO 97/49237 | 12/1997 |
| WO | WO 98/01995 | 1/1998 |
| WO | WO 98/07277 | 2/1998 |
| WO | WO 98/10589 | 3/1998 |
| WO | WO 98/12872 | 3/1998 |
| WO | WO 98/17033 | 4/1998 |
| WO | WO-98/17064 | 4/1998 |
| WO | WO 98/18260 | 4/1998 |
| WO | WO 98/19459 | 5/1998 |
| WO | WO 98/26528 | 6/1998 |
| WO | WO 98/26584 | 6/1998 |
| WO | WO 98/26596 | 6/1998 |
| WO | WO 98/31115 | 7/1998 |
| WO | WO 98/31116 | 7/1998 |

(56) References Cited

FOREIGN PATENT DOCUMENTS

| | | |
|---|---|---|
| WO | WO 98/34405 | 8/1998 |
| WO | WO 98/38831 | 9/1998 |
| WO | WO 98/47279 | 10/1998 |
| WO | WO-98/47283 | 10/1998 |
| WO | WO 98/48566 | 10/1998 |
| WO | WO 99/03267 | 1/1999 |
| WO | WO 99/04561 | 1/1999 |
| WO | WO 99/11060 | 3/1999 |
| WO | WO 99/12320 | 3/1999 |
| WO | WO 9914945 | 3/1999 |
| WO | WO 99/27681 | 6/1999 |
| WO | WO 99/28897 | 6/1999 |
| WO | WO 9935753 | 7/1999 |
| WO | WO 99/39466 | 8/1999 |
| WO | WO 99/56473 | 11/1999 |
| WO | WO-99/60790 | 11/1999 |
| WO | WO 99/65244 | 12/1999 |
| WO | WO 99/66725 | 12/1999 |
| WO | WO 9964969 | 12/1999 |
| WO | WO 00/04706 | 1/2000 |
| WO | WO 0004707 | 1/2000 |
| WO | WO 0004709 | 1/2000 |
| WO | WO 00/05885 | 2/2000 |
| WO | WO 00/11869 | 3/2000 |
| WO | WO-00/16548 | 3/2000 |
| WO | WO 0017738 | 3/2000 |
| WO | WO 00/30345 | 5/2000 |
| WO | WO 0034891 | 6/2000 |
| WO | WO 00/59230 | 10/2000 |
| WO | WO 0059230 | 10/2000 |
| WO | WO 00/74383 | 12/2000 |
| WO | WO 0074383 | 12/2000 |
| WO | WO 01/01677 | 1/2001 |
| WO | WO 01/01689 | 1/2001 |
| WO | WO 0110126 | 2/2001 |
| WO | WO 01/35662 | 5/2001 |
| WO | WO-0147248 | 6/2001 |
| WO | WO 01/50743 | 7/2001 |
| WO | WO 0167772 | 9/2001 |
| WO | WO 03043326 | 5/2003 |
| WO | WO 03046727 | 6/2003 |
| WO | WO 2004/032511 | 4/2004 |
| WO | WO 2004/061699 | 7/2004 |
| WO | WO 2005046174 | 5/2005 |
| WO | WO 2007/078503 | 7/2007 |
| WO | WO 2009/009106 | 1/2009 |

OTHER PUBLICATIONS

Haas at al., Proceedings of ICIP 2002 Personalized News Through Content Augmentation and Profiling:, Rochester, NY, Sep. 2002.
Hofmann, Neumann, Oberlies, and Schadwinkel, "Videotext Programmiert Videorecorder," Rundfunktechnische Mitteilungen, Nov.-Dec. 1982, pp. 254-257 (translation attached).
"Electronic Programme Guide (EPG); Protocol for a TV Guide using electronic data transmission" by European Telecommunications Standards Institute, May 1997, Valbonne, France, publication ETS 300 707.
"Windows 98 Feature Combines TV, Terminal and the Internet," *New York Times*, Aug. 18, 1998.
"Digital Video Broadcasting (DVB): DVB specification for data broadcasting", European Telecommunications Standards Institute, Draft EN 301 192 V1.2.1 (Jan. 1999).
"Rewind, reply and unwind with new high-tecfh TV devices," by Lawrence J. Magid, *LA Times*. This document was printed from the internet on Jun. 6, 1999 and bears a date of May 19, 1999.
International Search Report—PCT/US 2008/008490—Dec. 8, 2008.
U.S. Appl. No. 09/332,244, filed Jun. 11, 1999, Ellis.
U.S. Appl. No. 09/330,860, filed Jun. 11, 1999, Ellis.
U.S. Appl. No. 09/354,344, filed Jul. 16, 1999, Ellis.
CableData brochure, "A New Approach to Addressability" (undated).
"Addressable Converters: A New Development at CableData," Via Cable, vol. 1, No. 12 (Dec. 1981).
Sorce, J. et al., "Designing a Broadband Residential Entertainment Service: A Case Study," 13th International Symposium Human Factors in Telecommunications, Torino, Italy, Sep. 10-14, 1990 pp. 141-148.
Brugliera, V. "Digital On-Screen Display—A New Technology for the Consumer Interface," Symposium Record Cable Sessions, 18th International Television Symposium and Technical Exhibition, Montreux, Switzerland Jun. 10-15, 1993, pp. 571-586 (Jun. 11, 1993).
Miller, M. D. "A Scenario for the Deployment of Interactive Multimedia Cable Television Systems in the United States in the 1990's," Proceedings of the IEEE, vol. 82, No. 4, pp. 585-589 (Apr. 1994).
Chang, Y. et al., "An Open-Systems Approach to Video on Demand," IEEE Communications Magazine, vol. 32, No. 5 pp. 68-80 (May 1994).
The New York Times Website Article, "2 Makers Plan Introductions of Digital VCR", by John Markoff, Mar. 29, 1999.
David M. Rudnick, U.S. Appl. No. 09/283,681, filed Apr. 1, 1999, entitled Interactive Television Program Guide System Having Graphic Arrangements of Program Event Regions.
Li et al., "Distributed Multimedia Systems," Proceedings of the IEEE vol. 85 No. 7: pp. 1063-1108 (Jul. 1997).
S. Gondow et al., "The Architecture of Communication Migration and Media State Management for Distributed Applications on Wearable Networks," Information Processing Society of Japan (National Conference Lecture Collected Paper), Tokyo, Japan, Oct. 3, 2000, pp. 1-2.
F. Teraoka et al., "Host Migration Transparancy in IP networks: The VIP Approach" ACM SIGCOMM—Computer Communication Review, ACM Press, New York, NY, USA, Jan. 1993, pp. 45-65.
Office Action dated Feb. 3, 2010 for related JP Patent Application 2004-550446.
Office Action dated Feb. 25, 2010 for related EU Patent Application 06848226.4.
Office Action dated Mar. 29, 2010 for related U.S. Appl. No. 10/288,505.
Office Action dated Sep. 21, 2009 for related U.S. Appl. No. 10/288,505.
International Search Report of the International Searching Authority for related foreign application PCT/US/20061049398.
Pham et al,, "Exploiting Location-Based Composite Devices to Support and Facilitate Situated Ubiquitous Computing," HUC 2000, LNCS 1927, pp. 143-156.
Arango et al., "The Touring Machine System," Communications of the ACM, Jan. 1993, vol. 36, No. 1, pp. 68-77.
Fortino et al., A Cooperative Playback System for On-Demand Multimedia Sessions over Internet, 2000 IEEE, pp. 41-44.
Han et al., "Dynamic Adaptation in an Image Transcoding Proxy for Mobile Web Browsing," IEEE Personal Communications, Dec. 1998, pp. 8-17.
Mah et al., "Providing Network Video Service to Mobile Clients," 1993 IEEE, pp. 48-54.
A. C. Snoeren et al., "An End-to-End Approach to Host Mobility" 6th ACM—IEEE International Conference on Mobile Computing and Networking (MOBICOM 2000), Boston, MA, USA, Aug. 2000, pp. 1-12.
Realplayer 8 Plus User Manual, Rev. 1, Real Networks, Inc. p. 32 (2000).
"Rewind, reply and unwind with new high-tech TV devices," by Lawrence J. Magid, LA Times (This document was printed from the internet on Jun. 6, 1999 and bears a date of May 19, 1999).
IBM Corporation "IBM Content Manager VideoCharger, New dimensions for enterprise content, DB2 Data Management Software" pp. 1-4, Mar. 2002.
IBM Corporation "IBM VideoCharger for AIX Version 2.0" Streaming the power of video to your desktop, pp. 1-5 Visit the IBM VideoCharger Website at: www.software.ibm.com/data/videocharger/.
IBM Corporation "IBM Content Manager VideoCharger, Version 8, New dimensions for enterprise content, DB2 Data Management Software, pp. 1-4," May 2002, Visit IBM Web site at ibm.com/software/data/videocharger.
IBM Corporation, "IBM Video Charger Server", pp. 102, Jun. 1998.

(56) References Cited

OTHER PUBLICATIONS

Telecommunications Information Networking Architecture Consortium "TINA-C Deliverable" Service Architecture, Version 5.0, Jun. 16, 1997 (167 pgs.).
C.S. Hong, et al. "A Networking Architecture for Mobility Services Using Mobile Agent Approach" Proceedings of the TINA '97—Global Convergence of Telecommunications and Distributed Object Computing 0-8186-8335-x/97, 1997 IEEE, (11 pgs).
A. Limongiello, et al. An Experimental Open Architecture to Support Multimedia Services based on CORBA, Java and WWW Technologies, TELECOM Italia Headquarters (undated) pp. 69-75.
Abarca C. et al., Telecommunications Information Networking Architecture Consortium "TINA-C Deliverable" Service Architecture, Version 5.0, Jun. 16, 1997 (168 pgs.).
Bestler, C. et al., "Flexible Data Structures and Interface Rituals for Rapid Development of OSD Applications", published NCTA Technical Papers, pp. 223-236, 1993.
Chawathe, Y., et al., "A Proxy Architecture for Reliable Multicast in Heterogeneous Environments", ACM Multimedia '98, Bristol, UK, pp. 151-159, 1998.
Davic 1.3.1 Specification Part 1, Published in 1998 by Digital Audio-Visual Counsel (86 pages).
Davis, B., "Violence on Television", TV Guide on Screen to the US House of Representatives Committee of Energy and Commerce Subcommittee on Telecommunications and Finance, pp. 93-163, Jun. 25, 1993.
December, J., "Understanding the Potential of Java and the Web", Presenting Java, published Sep. 20, 1995.
Dias, D. "A Scalable and Highly Available Web Server", IEEE, Proceedings of COMPCON '96, p. 85-92, 1996.
Don Imus: The Thinking Man's Shock Jock, Broadcasting Cable, Jun. 13, 1994, pp. 49-52.
Federighi, C. et al. "A Distributed Hierarchical Storage Manager for a Video-on-Demand System", Storage and Retrieval for Image and Video Databases II, IS&T/SPIE, Symp. on Elec. Imaging Sci. & Tech., San Jose, CA, pp. 1-13, Feb. 1994.
Fox, A., et al., Adapting to Network and Client Variation Using Infrastructural Proxies: Lessons and Perspectives, Personal Communications IEEE, pp. 10-19 (Aug. 1998) (15 pages).
Hong, et al. "A Networking Architecture for Mobility Services Using Mobile Agent Approach" Proceedings of the TINA '97—Global Convergence of Telecommunications and Distributed Object Computing 0-8186-8335-x/97, 1997 IEEE, (11 pgs).
Inouye et al., "System Support for Mobile Multimedia Applications", Proc. of the 7th Intl. Workshop on Network and Operating System Support for Digital Audio and Video, 1997, pp. 143-154.
ITC Investigation of Certain Products Containing Interactive Program Guide and Parental Control Technology, Investigation No. 337-TA-845, "Commission Opinion" Dec. 11, 2013 (27 pages).
ITC Investigation of Certain Products Containing Interactive Program Guide and Parental Control Technology, Investigation No. 337-TA-845, Complainants' Initial Submission in Response to Commission's Determination to Review the Final Initial Determination Aug. 23, 2013 (55 pages).
ITC Investigation of Certain Products Containing Interactive Program Guide and Parental Control Technology, Investigation No. 337-TA-845, "Complainants' Reply Submission in Response to Commission's Determination to Review the Final Initial Determination" Aug. 30, 2013 (32 pages).
ITC Investigation of Certain Products Containing Interactive Program Guide and Parental Control Technology, Investigation No. 337-TA-845, "Notice of Commission Determination to Review in Its Entirety a Final Initial Determination Finding No Violation of Section 337" Aug. 9, 2013 (6 pages).
ITC Investigation of Certain Products Containing Interactive Program Guide and Parental Control Technology, Investigation No. 337-TA-845, "Notice of the Commission's Final Determination Finding No Violation of Section 337; Termination of the Investigation" Nov. 1, 2013 (4 pages).
ITC Investigation of Certain Products Containing Interactive Program Guide and Parental Control Technology, Investigation No. 337-TA-845, "Respondent Netflix Response to Complainants' Petition for Review" Jul. 12, 2013 (64 pages).
ITC Investigation of Certain Products Containing Interactive Program Guide and Parental Control Technology, Investigation No. 337-TA-845, "Respondent Netflix, Inc.'s Summary of Issues for Its Response to Complainants Petition for Review" Jul. 12, 2013 (6 pages).
ITC Investigation of Certain Products Containing Interactive Program Guide and Parental Control Technology, Investigation No. 337-TA-845, "Respondents Netflix, Inc.'s and Roku, Inc.'s Response to Complainants' Initial Submission in Response to Commission's Determination to Review the Final Initial Determination" Aug. 30, 2013 (43 pages).
ITC Investigation of Certain Products Containing Interactive Program Guide and Parental Control Technology, Investigation No. 337-TA-845, "Respondents' Response to the Commission's Determination to Review the Final Initial Determination" Aug. 26, 2013 (62 pages).
ITC Investigation of Certain Products Containing Interactive Program Guide and Parental Control Technology, Investigation No. 337-TA-845, "Complainants' Opposition to Respondents' Contingent Petition for Review of Final Initial Determination" Jul. 2, 2013 (51 pages).
ITC Investigation of Certain Products Containing Interactive Program Guide and Parental Control Technology, Investigation No. 337-TA-845, "Final Initial Determination" Jun. 7, 2013 (375 pages) Parts 1 and 2.
ITC Investigation of Certain Products Containing Interactive Program Guide and Parental Control Technology, Investigation No. 337-TA-845, "Open Session Transcript" Mar. 5, 2013 (642 pages) Parts 1 and 2.
ITC Investigation of Certain Products Containing Interactive Program Guide and Parental Control Technology, Investigation No. 337-TA-845, "Respondents' Notice of Prior Art" Oct. 12, 2012 (39 pages).
Jaidev, "XSLT—A Wired and Wireless Case Study," http://csharpcomputing.com/XMLTutorial/Lesson15.htm.
Knutsson, B. et al., "Transparent Proxy Signalling", Journal of Communications and Networks, vol. 3, No. 2, p. 164-174, Jun. 2001.
Limongiello, et al. An Experimental Open Architecture to Support Multimedia Services based on CORBA, Java and WWW Technologies, TELECOM Italia Headquarters (undated) pp. 69-75.
*Rovi et al. v. Hulu, LLC*, Central District of California Case No. 12-cv-04756, "Order Denying Hulu's Motion for Summary Judgment That the '906 Patent is Invalid," Feb. 5, 2013 (43 pages).
*Rovi et al. v. Hulu, LLC*, Central District of California Case No. 12-cv-04756, "Plaintiffs' Opposition to Hulu's Motion for Summary Judgment that the '906 Patent is Invalid" Dec. 17, 2012 (19 pages).
*Rovi et al. v. Hulu, LLC*, Central District of California Case No. 12-cv-04756, "Plaintiffs' Statement of Genuine Issues in Support of Plaintiff's Opposition to Defendant Hulu LLC's Motion for Summary Judgment that the '906 Patent is Invalid" Dec. 17, 2012 (36 pages).
*Rovi et al. v. Hulu, LLC*, Central District of California Case No. 12-cv-04756, "Reporter's Transcript of Motion Hearing Jan. 7, 2013" Jan. 16, 2013 (95 pages).
Rowe, L., et al., A Continuous Media Player, Proc. 3rd Int. Workshop on Network and OS Support for Digital Audio and Video (Nov. 1992).
Sandsta et al., "Design and Implementation of the Elvira Video Server," Norwegian Computer Science Conference NIK'96 (Norsk Informatikkonferanse), 1996, pp. 259-270.
Schroeder, T. et al. "Scalable Web Server Clustering Technologies", University of Nebraska—Lincoln CSE Journal Articles, Department of Computer Science and Engineering, pp. 38-45, Jun. 1, 2000.
Singru et al., "Framework for Interactive Video-On-Demand Service", Proc. of the IEEE 14th Annual Intl. Phoenix Conf. on Computer and Communications, 1995, pp. 636-642.
Smith et al., "Transcoding Internet Content for Heterogeneous Client Devices", Proc. IEEE Int. Conf. on Circuits and Syst. (ISCAS), May 1998, pp. 599-602.

(56) References Cited

OTHER PUBLICATIONS

Smith, John R., "Digital Video Libraries and the Internet", IEEE Communications Magazine, 1999, vol. 37, pp. 92-97.
Snoeren et al., "An End-to-End Approach to Host Mobility" 6th ACM—IEEE International Conference on Mobile Computing and Networking (MOBICOM 2000), Boston, MA, USA, Aug. 2000, pp. 1-12.
Third Party Submission Under 37 CFR 1.290 filed Jul. 31, 2013, U.S. Appl. No. 13/181,915 Concise Description of Relevance, (30 pages).
TV Listing Star on the Compute, Central Penn Business Journal/HighBeam Research, pp. 1-4, Mar. 15, 1996.
Uniden UST-4800 Integrated Receiver/Descrambler, Installation Guide, Installation Device, copyright 1990, Uniden America Corporation, 60 pages.
Uniden UST-4800 Integrated Receiver/Descrambler, Operating Guide, copyright 1990, Uniden America Corporation, 24 pages.
Uniden UST-4800 Super Integrated Receiver/Descrambler, Preliminary Reference Manual, 80 pages, Nov. 12, 1991.
Verma, D., "Content Distribution Networks—An Engineering Approach", p. 24-49, 2002.
Wedlund, Elin and Henning Schulzrinne, Mobility Support using SIP, § 4, ACM.
Zahariadis et al., "Interactive Multimedia Services to Residential Users," IEEE Communications Magazine, 1997, vol. 35, pp. 61-68.
ITC Investigation of Certain Products Containing Interactive Program Guide and Parental Control Technology, Investigation No. 337-TA-845, "Complainants' Petition for Review of Final Initial Determination" Jun. 24, 2013 (55 pages).
ITC Investigation of Certain Products Containing Interactive Program Guide and Parental Control Technology, Investigation No. 337-TA-845, "Order Denying Summary Determination Motions" Mar. 4, 2013 (6 pages).
ITC Investigation of Certain Products Containing Interactive Program Guide and Parental Control Technology, Investigation No. 337-TA-845, "Respondents Netflix, Inc. and Roku, Inc.s Contingent Petition for Review" Jun. 24, 2013 (53 pages).
*Rovi et al.* v. *Hulu, LLC*, Central District of California Case No. 12-cv-04756, "Defendant Hulu's Memorandum of Points and Authorities in Support of Hulu's Motion for Summary Judgment That the '906 Patent is Invalid" Dec. 3, 2012 (32 pages).
*Rovi et al.* v. *Hulu, LLC*, Central District of California Case No. 12-cv-04756, "Plaintiffs Opposition to Hulu's Motion for Summary Judgment That the '906 Patent is Invalid" Dec. 17, 2012 (29 pages).
*Rovi et al.* v. *Hulu, LLC*, Central District of California Case No. 12-cv-04756, "Defendant Hulu's Reply Memorandum in Support of Hulu's Motion for Summary Judgment That the '906 Patent is Invalid" Dec. 26, 2012 (32 pages).
*Rovi et al.* v. *Hulu, LLC*, Central District of California Case No. 12-cv-04756, "Order Denying Hulu's Motion for Summary Judgment That the '906 Patent is Invalid" Feb. 5, 2013 (43 pages).
Brody, Information highway: The home front, Technology Review, vol. 96:6 (Aug./Sep. 1993), p. 30 (7 pages).
Business Wire, Gemstar Adopts Shareholder Rights Plan and Amendments to Articles and Memorandum of Association, Jul. 12 1998, p. 1.
Bwanausi, 'Daily News' Xones Into New Editions, ADWEEK Western Edition, Sep. 17 1990, p. 12.
Cherrick et al., Individually addressable receiver with interactive channel guide display, VCR, and cable box control, IEEE Transactions on Consumer Electronics, 40:3 (1994), pp. 317-328.
Costello, On-screen TV program guides, Stereo Review, 60:8 (Aug. 1995), p. 20.
Fall, A Peer-to-Peer I/O System in Support of I/O Intensive Workloads, PhD Dissertation, University of California, San Diego (1994) (133 pages).
Gemstar, Gemstar Buys VideoGuide Stake, Consumer Electronics, Feb. 26, 1996, p. 11.
Hodge et al., Video on demand: architecture, systems, and applications, Selected Papers from the SMPTE Advanced Television and Electronic Imaging Conference, Feb. 4, 1994, pp. 120-132.

Isobe at al., Interactivity in broadcasting and its application to ISDB service, IEEE Transactions on Broadcasting, vol. 42:3 (Sep. 1996), pp. 179-185.
Li et al., Vision: a digital library, Proceedings of the ACM Conference on Digital Libraries, Mar. 20-23, 1996, pp. 19-27.
McNab et al., A distributed digital library architecture incorporating different index styles, IEEE International Forum on Research and Technology Advances in Digital Libraries, Apr. 22-24, 1998, pp. 36-45.
Moss, 500 Channels Awe Advertisers, Multichannel News (Apr. 19, 1993), p. 1A.
*Netflix, Inc.* v. *Rovi Corporation et al.*, Netflix's Joint Claim Construction and Prehearing Statement Pursuant to Patent Local Rule 4-3, dated Dec. 19, 2014, 23 pages.
*Netflix, Inc.* v. *Rovi Corporation et al.*, Netflix's Responsive Claim Construction Brief, dated Feb. 18, 2015, 30 pages.
*Netflix, Inc.* v. *Rovi Corporation et al.*, Redacted Version of Motion for Summary Judgment of Invalidity Under 35 U.S.C. § 101, dated Dec. 15, 2014, 30 pages.
*Netflix, Inc.* v. *Rovi Corporation et al.*, Rovi's Opening Claim Construction Brief Pursuant to Patent Local Rule 4-5, dated Jan. 30, 2015, 30 pages.
*Netflix, Inc.* v. *Rovi Corporation et al.*, Rovi's Opposition to Netflix's Motion for Summary Judgment of Invalidity Under 35 U.S.C. § 101, dated Jan. 30, 2015, 33 pages.
Pohlman, House Calls, Video Magazine, vol. 20:6 (Oct. 1996), pp. 25-27.
PR Newswire, NextLevel Systems, Inc. and nCUBE demonstrate their integrated near-video-on-demand solution on NextLevel's advanced analog CFT 2200 platform, Dec. 10, 1997 (3 pages).
Premium Channels Publishing Company Inc., Premium channels publishing will market a weekly program guide listing pay TV, cable and broadcast offerings by daypart, Cable Television Business, Nov. 15, 1982, p. 194.
Scully, Digital librarian could prove PPV boon, Broadcasting & Cable, Jun. 7, 1993, p. 97.
Scully, For some, interactive future is now, Broadcast & Cable, Jun. 1993, pp. 77-78.
Tedesco, Thomson to produce RCA NC box for NetChannel, Broadcasting & Cable, 127:30, p. 100.
Tedesco, TV—'Net vendors resist the marketing Web, Broadcasting & Cable, 127:21 (May 19, 1997), p. 55.
Time Warner Signs Tulsa Firm to Provide Cable Program Guide, Journal Record, May 25, 1994 (2 pages).
Tsao and Huang, An Efficient storage in near video-on-demand systems, IEEE Transactions on Consumer Electronics, vol. 44:1 (Feb. 1998), p. 27.
Tsao et al., A Novel Data Placement Scheme on Optical Discs for Near-VOD Servers, Interactive Distributed Multimedia Systems and Telecommunications Services Lecture Notes in Computer Science, vol. 1309 (1997), pp. 133-142.
United Media Enterprises, United Media Enterprises (New York, NY) affiliate 'TV Watch/DIP' now provides a monthly satellite print guide with schedules for all satellite and pay services, Satellite News, Dec. 24, 1980, p. 7.
Acceptance thesis of Bo Zou profs Nahrstedt, Jul. 2002 (1 page).
Brown, "Supporting user mobility", pp. 69-77, 1996 (9 pages).
Chawathe, et al., "A Proxy Architecture for Reliable Multicast in Heterogeneous Environments", ACM Multimedia '98, Bristol, UK, pp. 151-159, 1998 (9 pages).
CV prof Klara Nahrstedt, https://wiki.engr.illinois.edu/display/monet/Klara+Nahrstedt, 2014, (2 pages).
DAVIC 1.3.1. Description of Digital Audio-Visual Functionalities 1998 (86 pages).
Decision of the Technical Board of Appeal 3.3.05, Feb. 2, 2012 (10 pages).
Declaration of David King, executed Mar. 21, 2013 (11 pages).
Dias, "A Scalable and Highly Available Web Server", IEEE, Proceedings of COMPCON '96, p. 85-92, 1996 (8 pages).
Draper et al., TV Anytime, Proceedings International Broadcasting Convention, 1999, pp. 103-108 (4 pages).
Email Bo Zou, Jan. 6, 2012 (1 page).
Email Hong dated Nov. 1, 2012 (2 pages).

(56) References Cited

OTHER PUBLICATIONS

Email Klara Nahrstedt, Jan. 20, 2012 (1 page).
Email Roy Campbell, Jan. 18, 2012 (1 page).
Email Wojtowicz dated Nov. 12, 2012 (2 pages).
EP 99963412.4 Official Communication dated Mar. 6, 2007 (80 pages).
EP 99963412.4 Official Communication dated Oct. 21, 2010 (8 pages).
Fox, et al., Adapting to Network and Client Variation Using Infrastructural Proxies: Lessons and Perspectives, Personal Communications IEEE, pp. 10-19 (Aug. 1998) (15 pages).
Goncalves, et al., "Video-On-Demand Provision Using TINA", 2000 (6 pages).
Haas, et al., Proceedings of ICIP 2002 "Personalized News Through Content Augmentation and Profiling", Rochester, NY, Sep. 2002 (4 pages).
Huyng, "Implementations of User Mobility Support for UPC in JAVA/CORBA Environment," The University of British Columbia, Aug. 1999 (86 pages).
Introducing VideoShare.com; Consumers and Small Businesses Can Now Create and Add Video to All Web-Based Communications. Business Wire, Mar. 8, 2000. Complete text, (Abstract). Gale Group PROMT [online] USA. [Recovered on Mar. 23, 2015]. Recovered from: ProQuest LLC. (2 pages).
Jaidev, "XSLT—A Wired and Wireless Case Study," http://csharpcomputing.com/XMLTutorial/Lesson15.htm, Oct. 14, 2005 (6 pages).
Letter from Delphine Kranz, University of Illinois at Urbana-Champaign, dated Feb. 6, 2012 (1 page).
Mobile Agent Approach, Global Convergence of Telecommunications and Distributed Object Computing, pp. 297-307 (1997), Section 8.4: X (11 pages).
Monet: Multimedia Operating System and Networking Group http://cairo.cs.uiuc.edu/publications/view.php?action=list&area=all&type=master, Sep. 21, 2011 (5 pages).
Nahrstedt, et al., "Multimedia Computing and Networking 2000", pp. 196-203 (Jan. 24-26, 2000) (9 pages).
*Netflix, Inc.* v. *Rovi Corporation et al.*, Rovi's Reply Claim Construction Brief Pursuant to Patent Local Rule 4-5, dated Mar. 2, 2015 (22 pages).
Nichols, On-screen guide to TV schedules can program a VCR, Too, Times Topics, New York Times Company, Jun. 26, 1995 (3 pages).
Play Time—21st Century Home—Part 2, PC Computing Dec. 1999 (4 pages).
Properties internet Bo Zou word doc (1 page) (2000).
Realplayer 8 Plus User Manual, Rev. 1, Real Networks, Inc. p. 32 (2000) (4 pages).
Reed, "Room to room video", Popular Science, May 1991, pp. 96-98 (3 pages).
Schmidt "Supporting Ubiquitous Computing with Stateless Consoles and Computation Caches" Aug. 2000 (140 pages).
Schroeder, et al., "Scalable Web Server Clustering Technologies", University of Nebraska—Lincoln CSE Journal Articles, Department of Computer Science and Engineering, pp. 38-45, Jun. 1, 2000.
TINA-C, Business Model and Reference Points, Version 4.0, May 22, 1997 (68 pages).
TINA-C, Service Architecture, Version 5.0, Jun. 16, 1997 (168 pages).
United Kingdom: BSKyB to launch integrated personal TV recorder, BBC Monitoring Media, Sep. 11, 2000 (3 pages).
Using Smart Cards With the Sun Ray Enterprize Appliance, Sun Microsystems, Sep. 1999 (19 pages).
U.S. Appl. No. 09/974,646 File History (452 pages).
U.S. Appl. No. 09/354,344, filed Jul. 6, 1999 (115 pages).
Verma, "Content Distribution Networks—An Engineering Approach", pg. 24-49 (2002) (16 pages).
Wedlund, et al. "Mobility Support using SIP", ACM/ IEEE International Conference on Wireless and Mobile Multimedia, pp. 76-82, Aug. 20, 1999.
Wikipedia "Multimedia Home Platform" from the internet at http://en.wikipedia.org/wiki/Multimedia_Home_Platform (undated) (1 page).
Wikipedia "Video on Demand" from the internet at http://enwikipedia.org/wiki/Video_on_demand (undated) (1 page).
Zou, "Mobile Id Protocol: A Badge-Activated Application Level Handoff of a Multimedia Streaming to Support User Mobility," 2000 (54 pages).

\* cited by examiner

Friday
12:44pm
March 31, 2006

The Simpsons
7-7:30 pm
2 FOX
TV-14
"Kamp Krusty", Repeat,
(1992) 110

| | 7:00 pm | 7:30 pm | 8:00 pm |
|---|---|---|---|
| 2 FOX | The Simpsons | King of the Hill | Joe Millionaire |
| 3 ABC | The Bourne Identity 108 | | |
| 4 NBC | Friends | Will & Grace | ER |
| 5 HBO (VOD) | HBO On Demand | | |
| Recorded | Display Recorded Program Listings | | |
| CNN.com | Access CNN.com Video Content | | |

ADVERTISEMENT

FIG. 1

SYSTEMS AND METHODS FOR MIRRORING AND TRANSCODING MEDIA CONTENT

CROSS-REFERENCE TO RELATED APPLICATION

This application is a continuation of U.S. patent application Ser. No. 11/827,649, filed Jul. 11, 2007, which is hereby incorporated by reference herein in its entirety.

BACKGROUND OF THE INVENTION

Recent technological innovations have led to an explosion in usage of consumer electronics, and in particular, portable user devices. It is not unusual for one user to store media content on a myriad of devices (from portable video devices and cell phones to handheld computers and set-top boxes). A problem arises when a user's devices have different sets of requirements and restrictions regarding the type and format of media content that may be delivered to or from a given device. Therefore, sharing media content between a variety of devices can quickly become unwieldy. Another problem arises because consumer electronics, such as portable devices, are prone to failure or loss, which may lead to loss of important, expensive, and sometimes irrecoverable, media content.

SUMMARY OF THE INVENTION

This invention is generally directed to systems and methods for providing access to media content, and in particular, to providing mirroring and transcoding of media content. Among other things, the present invention advantageously allows users to mirror media content stored on a source device onto a remote server and then remotely access the mirrored copy of the media content using other devices owned by the user or otherwise authorized to access the mirrored copy of the media content. For example, in a typical usage scenario, a user may record TV shows or movies using a digital video recorder (DVR) in the user's home network, mirror the recording onto a remote server, and then access the recording from the remote server using, for example, a portable video player (such as a portable television) in a transcoded format of the recording this is appropriate for the portable device without additional external hardware.

In some embodiments, the present invention advantageously provides an easy and automatic backup of media content stored on a source device so that, in case of failure or loss of the source device, the media content may be recovered from the mirrored copy. In addition to providing an additional copy of the media content for data recovery purposes, the mirrored copy may also be leveraged, in some embodiments, to provide access of the media content to other devices which would otherwise rely on the source device for access to the media content. By so doing, the source device is relieved of the burden of servicing remote access requests, and in particular, of the burden of transcoding media content to meet the various device format and specification requirements of the requesting devices. Furthermore, because other devices used by the user may not rely directly on the source device for access to media content stored on the source device, loss or failure of the source device does not preclude other devices from accessing the media content. Unlike known device-based transcoding or backup systems, the present invention does not require the user to acquire additional external devices which may add significantly to system costs, or to acquire knowledge of complex processes to set up various devices to communicate effectively. In some embodiments, the network-based approach of the present invention may also advantageously enable service enhancements such as support for new and future coding formats that may be severely limited in device-based systems.

As used herein, "transcoding" refers to manipulating digitally compressed and coded data (for example video information) in order to convert it from one format (or specification) to another. Where the original, uncompressed source material (rather than a digitally compressed version of the source material) is available to the transcoder, "transcoding," as used herein, may also refer to encoding the original, uncompressed format of the source material into a new analog or digital format of the source material. As used herein, "media content" refers to any form of electronic information, and may be in analog or digital format. Media content may include, but is not limited to, video content (e.g., TV shows, movies, video advertisement, video recording, etc.), audio content (e.g. music, voice messages, audio lectures, other audio recordings, etc.), images, text (e.g., reports, presentations, letters, forms, etc.), multi-media content (e.g., text, audio, graphics, animation, video, other interactive media, etc.), and any suitable combination thereof. As used herein, "mirroring" refers to the direct or indirect copying of a data set, and may typically include subsequent updates to the mirrored copy in order to keep the mirror up-to-date with the original data set. Mirroring may be "live," in which case the mirror copy is automatically updated in response to an update to the original data se. However, in some embodiments, mirroring may be performed according to a predetermined schedule. The data set mirrored may correspond to an entire storage drive or disk on a user device, or a subset of the data set on the storage drive.

In one aspect of the invention, media content stored on one user equipment device (referred to herein as the "source device") is mirrored on a remote server coupled to the user equipment device over a network. The user may mirror media content from multiple user devices associated with the user. In some embodiments, the user may designate one or more storage drives on the source device to be mirrored on the remote server. Alternatively, the user may designate a subset of the media content on one or more storage drives on the source device, and the remote server will mirror only the designated subset. For example, the user may choose to mirror only specific file types (e.g., MPEG, MP3, Windows Media, etc.). The user may also restrict access to the mirrored copies to authorized users, to authorized devices, or to authorized users using authorized requesting devices.

Media content mirrored on the remote server may be provided to other user devices in the original media content format or in a transcoded media content format. In some embodiments, the mirrored copy of the media content may be provided by the remote server to other devices in response to a request to access the media content received from the device. In some embodiments, the mirrored copy of the media content may be automatically provided to other user devices. As used herein, a "requesting device" is any device that receives a mirrored copy of the media content in an original or transcoded format regardless of whether or not the device transmitted a request for the media content. In some embodiments, in response to a user input received by a requesting device to access the media content, the remote server transcodes the mirrored copy of the media content into a second media content format that is appropriate for the requesting device and provides the mirrored, transcoded copy of the media content to the requesting device. In some embodiments, the remote server may select a media content format that is appropriate for the requesting device from a plurality of media content formats based on the capabilities of the requesting device. Capabilities of a requesting device that may affect the media content format selected by the remote server may include, but are not limited to, the storage, display, and bandwidth capabilities of the requesting device. In some embodiments, the remote server may transcode the mirrored copy of the media content into the second media content format prior to receiving the user request from the requesting device.

In some embodiments, the mirrored copy of the media content may be automatically provided to all user equipment devices designated by the user to receive such automatic updates in a appropriate media content format for each designated device. For example, a user may designate a personal computer (PC) to receive a mirrored copy of all media content mirrored from the user's portable digital assistant (PDA). In some embodiments, mirrored content from these particular source devices may be provided to the designated user device or devices based, for example, on a user-determined schedule. Thus, in addition to providing a backup solution for media content on all the user's devices, in some embodiments, the present invention may also serve to synchronize media content across various user equipment devices without requiring external transcoding hardware, regardless of the physical proximity of devices to each other. In this manner, the user may be provided with immediate and automatic access to all of the user's media content from any of the devices owned or authorized by the user.

In some embodiments, media content provided by the remote server may be played by the remote server on the requesting device. In these embodiments, the remote server may maintain a pointer to the media content stream, and adjust the pointer in response to activation of various playback controls provided on the requesting device. In some embodiments, the user may be provided with VCR-like features such as, for example, the ability to play, stop, rewind, fast-forward, and pause the media content. A user input to activate any of the VCR-like controls may be received by the requesting device and transmitted from the requesting device to the remote server. Upon receiving the user input to activate the control from the requesting device, the remote server may adjust the pointer position in accordance with the activated control. For example, in response to a user input to fast-forward the media content, the remote server may advance the pointer to skip a portion of the streaming media content that corresponds to the fast-forwarded section. In some embodiments, the media content may be provided to the requesting device to be played by a media player that is resident on the requesting device. In these embodiments, the requested media content may be received by the requesting device along with appropriate metadata (e.g., subtitles) for playing the received media content.

In some embodiments, transcoding of the media content may occur in real-time, in concurrence with playing the media content on the requesting device. For example, where appropriate, the remote server may first transcode and provide to the requesting device a portion of the media content corresponding to the beginning of the media content. The remote server may subsequently transcode and provide the remainder of the media content while the already provided portion is played on the requesting device. By so doing, the media content can be accessed quickly and readily with only minimal, if any, delay. In some embodiments, (e.g., where the particular media content is frequently requested by the same requesting device or several requesting devices in the same format), the mirrored copy of the media content may be transcoded into that format and cached on the remote server for servicing future requests.

In some embodiments, multiple remote servers may be used to mirror, transcode, and provide the media content to user equipment devices. For example, a remote mirroring server may store mirrored copies of media content, and a remote transcoding server, that is separate from the remote mirroring server, may service requests from requesting devices or provide automatic updates to designated devices. In these embodiments, the remote transcoding server may, for example, provide the mirrored, transcoded copies of the media content to requesting devices using mirrored copies of the media content obtained from the remote mirroring server. The remote transcoding server may obtain a mirrored copy of the media content in response to an access request, and/or in anticipation of future requests. For example, the remote transcoding server may obtain and pre-transcode media content based on the frequency of access of requests for the media content, or based on some other mechanism for predicting access such as, for example, repeated past access requests during a particular time of day. In some embodiments, mirroring and transcoding may be performed, respectively, by first and second applications resident on the same remote server.

The mirrored copy of the media content may also be provided to other devices without transcoding. For example, media content mirrored from a set-top box that is later replaced due, for example, to device failure may be provided to the replacement set-top box without transcoding, if the mirrored copy of the media content is already in a media content format that is supported by the replacement set-top box. Similarly, a user may recover media content from, a lost cellular telephone by accessing a mirrored copy of the media content using a replacement cellular telephone without transcoding.

In addition to providing the mirrored copy of the media content in a transcoded or original format to other user equipment devices, the remote server may also provide the mirrored copy of the media content to the source device. In some embodiments, the remote server may provide the mirrored copy of the media content to the source device to restore the original if, for any reason (including accidental loss of the media content), the source device no longer stores the original media content. For example, the remote server may restore the media content on the source device from the mirrored copy in response to a user request received by the source device to access the lost media content. In some embodiments, to ensure efficient use of network and server resources, the remote server may not service requests to access the media content received by the source device if the source device still maintains a copy of the requested media content. In such cases, the source device may service user requests to access the media content from the local copy.

The source device and the requesting device may each be any suitable user equipment device that is capable of remote communication with a server in a client-server configuration. In some embodiments, the source device or the requesting device (or both) may be a mobile user device such as, for example, a cellular telephone, a laptop computer, a personal digital assistant, a handheld computer, a portable television system, an automobile television system, a portable media player, or any combination of these devices. In some embodiments, the source device or the requesting device (or both) may be installed or standard equipment such as, for example, a personal computer, a set-top box, a digital video recorder, an optical disc recorder, a digital camera, a home telephone, a laptop computer, a media player, other installed equipment, or any combination of these devices. In some embodiments, the source device or the requesting device (or both) may access the media content using an interactive media guidance application.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which:

FIGS. 1 and 2 show illustrative display screens that may be used to provide media guidance application listings in accordance with one embodiment of the invention;

DETAILED DESCRIPTION OF THE PREFERRED EMBODIMENTS

Figure 2:
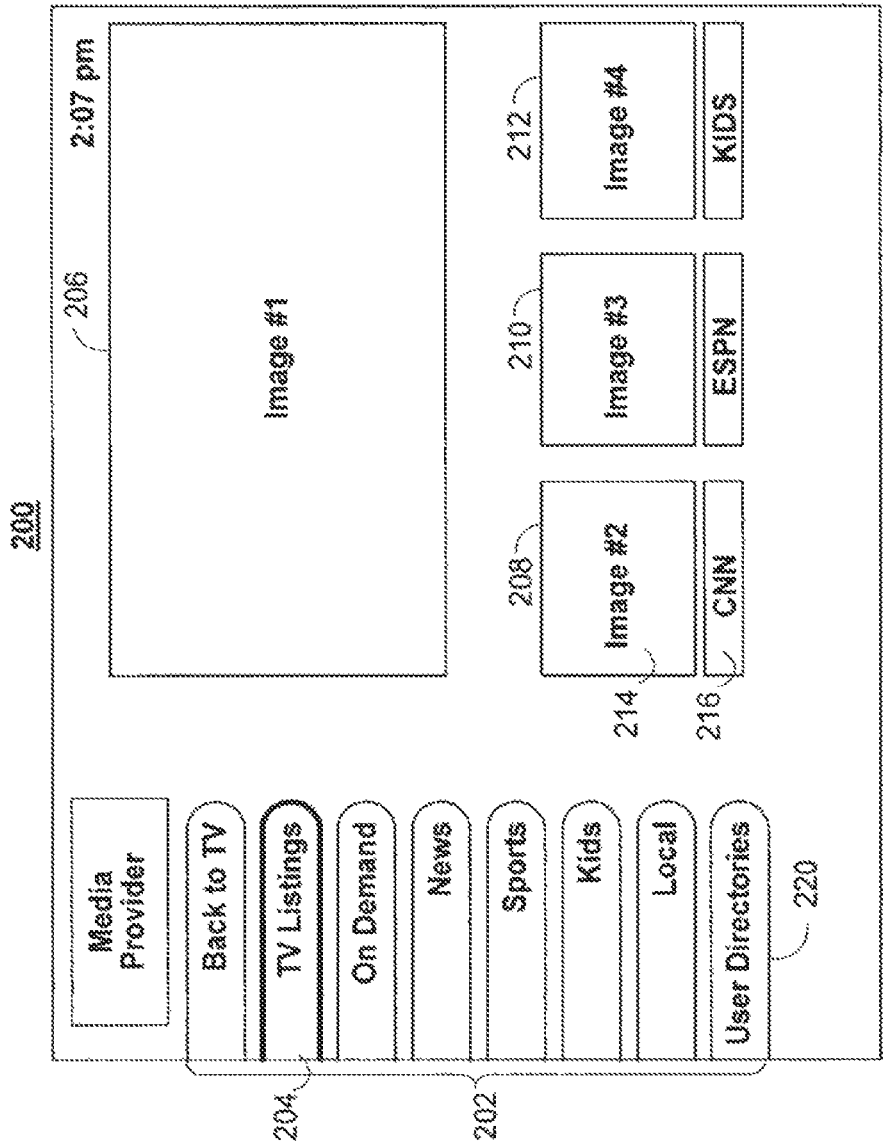

The amount of media available to users in any given media delivery system can be substantial. Consequently, many users desire a form of media guidance through an interface that allows users to efficiently navigate media selections and easily identify media that they may desire. An application which provides such guidance is referred to herein as an interactive media guidance application or, sometimes, a media guidance application or a guidance application.

Interactive media guidance applications may take various forms depending on the media for which they provide guidance. One typical type of media guidance application is an interactive television program guide. Interactive television program guides (sometimes referred to as electronic program guides) are well-known guidance applications that, among other things, allow users to navigate among and locate many types of media content including conventional television programming (provided via traditional broadcast, cable, satellite, Internet, or other means), as well as pay-per-view programs, on-demand programs (as in video-on-demand (VOD) systems), Internet content (e.g., streaming media, downloadable media, Webcasts, etc.), and other types of media or video content. Guidance applications also allow users to navigate among and locate content related to the video content including, for example, video clips, articles, advertisements, chat sessions, games, etc.

With the advent of the Internet, mobile computing, and high-speed wireless networks, users are increasingly accessing media on personal computers (PCs) and other devices on which they traditionally did not, such as hand-held computers, personal digital assistants (PDAs), mobile telephones, automobile television systems, mobile televisions, or other mobile devices. On these devices, users increasingly want to navigate among and locate desirable video clips, full motion videos (which may include television programs), images, music files, and other suitable media. Consequently, media guidance is also necessary on these devices, as well. For example, media guidance applications may be provided for media content available only through a television, for media content available only through one or more of these devices, or for media content available both through a television and one or more of these devices. The media guidance applications may be provided as on-line applications (i.e., provided on a web-site), or as stand-alone applications or clients on hand-held computers, PDAs, mobile telephones, or other mobile devices such as, for example, traditionally passive devices that have been enhanced with circuitry for operating media guidance applications (e.g., wrist watches, telephone hand sets, appliances (including kitchen or bathroom appliances), etc.). In some systems, users may control equipment remotely via a media guidance application. For example, users may access an online media guide and set recordings or other settings on their in home equipment. This may be accomplished by the on-line guide controlling the user's equipment directly or via another media guide that runs on the user's equipment. Remote access of interactive media guidance applications is discussed in greater detail in U.S. patent application Ser. No. 11/246,392, filed Oct. 7, 2005, the disclosure of which is hereby incorporated by reference herein in its entirety.

One of the functions of the media guidance application is to provide media listings and media information to users. FIGS. 1-2 and 5-6 show illustrative display screens that may be used to provide media guidance, and, in particular, media listings. The display screens shown in FIGS. 1-2 and 5-6 may be implemented on any suitable device or platform. While the displays of FIGS. 1-2 and 5-6 are illustrated as full screen displays, they may also be fully or partially overlaid over media content being displayed. A user may indicate a desire to access media information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media information organized in one of several ways, such as by time and channel in a grid, by time, by channel, by media type, by category (e.g., movies, sports, news, children, or other categories of programming), or other predefined, user-defined, or other organization criteria.

FIG. 1 shows illustrative grid program listings display 100 arranged by time and channel that also enables access to different types of media content in a single display. Display 100 may include grid 102 with: (1) a column of channel/media type identifiers 104, where each channel/media type identifier (which is a cell in the column) identifies a different channel or media type available; and (2) a row of time identifiers 106, where each time identifier (which is a cell in the row) identifies a time block of programming. Grid 102 also includes cells of program listings, such as program listing 108, where each listing provides the title of the program provided on the listing's associated channel and time. With a user input device, a user can select program listings by moving highlight region 110. Information relating to the program listing selected by highlight region 110 may be provided in program information region 112. Region 112 may include, for example, the program title, the program description, the time the program is provided (if applicable), the channel the program is on (if applicable), the program's rating, and other desired information.

In addition to providing access to linear programming provided according to a schedule, the media guidance application also provides access to non-linear programming which is not provided according to a schedule. Non-linear programming may include content from different media sources including on-demand media content (e.g., VOD), Internet content (e.g., streaming media, downloadable media, etc.), locally stored media content (e.g., video content stored on a digital video recorder (DVR), digital video disc (DVD), video cassette, compact disc (CD), etc.), or other time-insensitive media content. On-demand content may include both movies and original media content provided by a particular media provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming media or downloadable media through an Internet web site or other Internet access (e.g. FTP).

Grid 102 may provide listings for non-linear programming including on-demand listing 114, recorded media listing 116, and Internet content listing 118. A display combining listings for content from different types of media sources is sometimes referred to as a "mixed-media" display. The various permutations of the types of listings that may be displayed that are different than display 100 may be based on user selection or guidance application definition (e.g., a display of only recorded and broadcast listings, only on-demand and broadcast listings, etc.). As illustrated, listings 114, 116, and 118 are shown as spanning the entire time block displayed in grid 102 to indicate that selection of these listings may provide access to a display dedicated to on-demand listings, recorded listings, or Internet listings, respectively. In other embodiments, listings for these media types may be included directly in grid 102. Additional listings may be displayed in response to the user selecting one of the navigational icons 120. (Pressing an arrow key on a user input device may affect the display in a similar manner as selecting navigational icons 120.)

Display 100 may also include video region 122, advertisement 124, and options region 126. Video region 122 may allow the user to view and/or preview programs that are currently available, will be available, or were available to the user. The content of video region 122 may correspond to, or be independent from, one of the listings displayed in grid 102. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the present invention.

Advertisement 124 may provide an advertisement for media content that, depending on a viewer's access rights (e.g., for subscription programming), is currently available for viewing, will be available for viewing in the future, or may never become available for viewing, and may correspond to or be unrelated to one or more of the media listings in grid 102. Advertisement 124 may also be for products or services related or unrelated to the media content displayed in grid 102. Advertisement 124 may be selectable and provide further information about media content, provide information about a product or a service, enable purchasing of media content, a product, or a service, provide media content relating to the advertisement, etc. Advertisement 124 may be targeted based on a user's profile/preferences, monitored user activity, the type of display provided, or on other suitable targeted advertisement bases.

While advertisement 124 is shown as rectangular or banner shaped, advertisements may be provided in any suitable size, shape, and location in a guidance application display. For example, advertisement 124 may be provided as a rectangular shape that is horizontally adjacent to grid 102. This is sometimes referred to as a panel advertisement. In addition, advertisements may be overlaid over media content or a guidance application display or embedded within a display. Advertisements may also include text, images, rotating images, video clips, or other types of media content. Advertisements may be stored in the user equipment with the guidance application, in a database connected to the user equipment, in a remote location (including streaming media servers), or on other storage means or a combination of these locations. Providing advertisements in a media guidance application is discussed in greater detail in, for example, Knudson et al., U.S. patent application Ser. No. 10/347,673, filed Jan. 17, 2003, Ward, III et al. U.S. Pat. No. 6,756,997, issued Jun. 29, 2004, and Schein et al. U.S. Pat. No. 6,388,714, issued May 14, 2002, which are hereby incorporated by reference herein in their entireties. It will be appreciated that advertisements may be included in other media guidance application display screens of the present invention.

Options region 126 may allow the user to access different types of media content, media guidance application displays, and/or media guidance application features. Options region 126 may be part of display 100 (and other display screens of the present invention), or may be invoked by a user by selecting an on-screen option or pressing a dedicated or assignable button on a user input device. The selectable options within options region 126 may concern features related to program listings in grid 102 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, access to various types of listing displays, subscribe to a premium service, edit a user's profile, access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of media content listings displayed (e.g., only HDTV programming, user-specified broadcast channels based on favorite channel selections, re-ordering the display of channels, recommended media content, etc.), desired recording features (e.g., recording or series recordings for particular users, recording quality, etc.), parental control settings, and other desired customizations.

The media guidance application may allow a user to provide user profile information or may automatically compile user profile information. The media guidance application may, for example, monitor the media the user accesses and/or other interactions the user may have with the guidance application. Additionally, the media guidance application may obtain all or part of other user profiles that are related to a particular user (e.g., from other web sites on the Internet the user accesses, such as www.tvguide.com, from other media guidance applications the user accesses, from other interactive applications the user accesses, from a handheld device of the user, etc.), and/or obtain information about the user from other sources that the media guidance application may access. As a result, a user can be provided with a unified guidance application experience across the user's different devices. This type of user experience is described in greater detail below in connection with FIG. 1. Additional personalized media guidance application features are described in greater detail in Ellis et al., U.S. patent application Ser. No. 11/179,410, filed Jul. 11, 2005, Boyer et al., U.S. patent application Ser. No. 09/437,304, filed Nov. 9, 1999, and Ellis et al., U.S. patent application Ser. No. 10/105,128, filed Feb. 21, 2002, which are hereby incorporated by reference herein in their entireties.

Another display arrangement for providing media guidance is shown in FIG. 2. Video mosaic display 200 includes selectable options 202 for media content information organized based on media type, genre, and/or other organization criteria. In display 200, television listings option 204 is selected, thus providing listings 206, 208, 210, and 212 as broadcast program listings. In some embodiments, display 200 may include selectable feature 220, which may be selected by the user to access a directory of mirrored copy of the media content on a remote server. Detailed description of selectable feature 220 and the user directory are provided below with reference to screen 600 of FIG. 6.

Unlike the listings from FIG. 1, the listings in display 200 are not limited to simple text (e.g., the program title) and icons to describe media. Rather, in display 200 the listings may provide graphical images including cover art, still images from the media content, video clip previews, live video from the media content, or other types of media that indicate to a user the media content being described by the listing. Each of the graphical listings may also be accompanied by text to provide further information about the media content associated with the listing. For example, listing 208 may include more than one portion, including media portion 214 and text portion 216. Media portion 214 and/or text portion 216 may be selectable to view video in full-screen or to view program listings related to the video displayed in media portion 214 (e.g., to view listings for the channel that the video is displayed on).

The listings in display 200 are of different sizes (i.e., listing 206 is larger than listings 208, 210, and 212), but if desired, all the listings may be the same size. Listings may be of different sizes or graphically accentuated to indicate degrees of interest to the user or to emphasize certain content, as desired by the media provider or based on user preferences. Various systems and methods for graphically accentuating media listings are discussed in, for example, Yates, U.S. patent application Ser. No. 11/324,202, filed Dec. 29, 2005, which is hereby incorporated by reference herein in its entirety.

Figure 3:
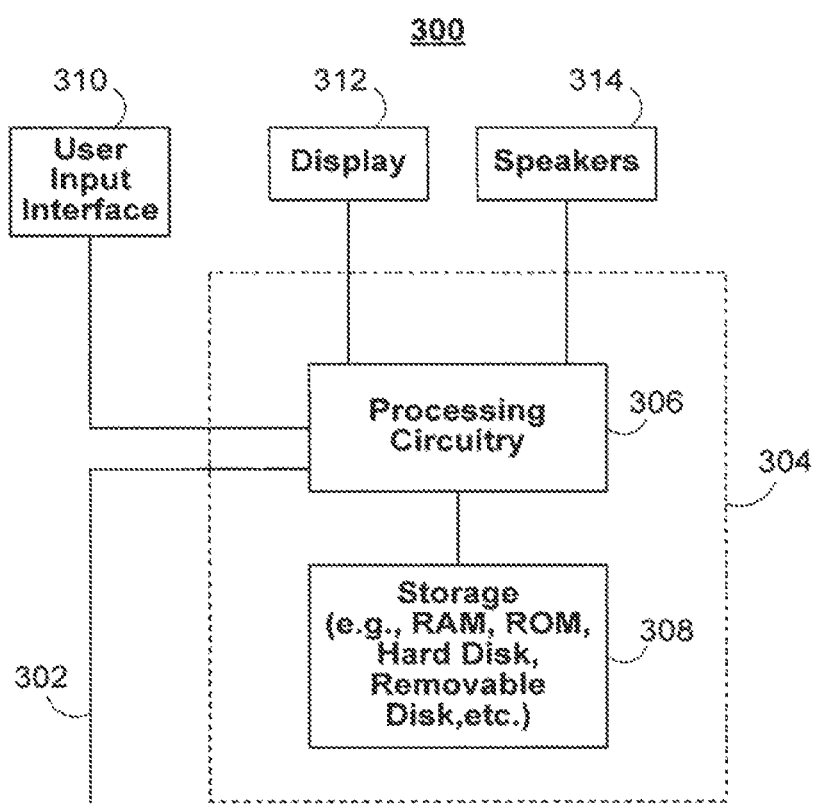
FIG. 3 shows an illustrative user equipment device in accordance with one embodiment of the invention.

Users may access media content and the media guidance application (and its display screens described above and below) from one or more of their user equipment devices. FIG. 3 shows a generalized embodiment of illustrative user equipment device 300. More specific implementations of user equipment devices are discussed below in connection with FIG. 1. User equipment device 300 may receive media content and data via input/output (hereinafter "I/O") path 302. I/O path 302 may provide media content (e.g., broadcast programming, on-demand programming, Internet content, and other video or audio) and data to control circuitry 304, which includes processing circuitry 306 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths, but are shown as a single path in FIG. 3 to avoid overcomplicating the drawing.

Control circuitry 304 may be based on any suitable processing circuitry 306 such as processing circuitry based on one or more microprocessors, microcontrollers, digital signal processors, programmable logic devices, etc. In some embodiments, control circuitry 304 executes instructions for a media guidance application stored in memory (i.e., storage 308). In client-server based embodiments, control circuitry 304 may include communications circuitry suitable for communicating with a guidance application server or other networks or servers. Communications circuitry may include a cable modem, an integrated services digital network (ISDN) modem, a digital subscriber line (DSL) modem, a telephone modem, or a wireless modem for communications with other equipment. Such communications may involve the Internet or any other suitable communications networks or paths (which is described in more detail in connection with FIG. 1). In addition, communications circuitry may include circuitry that enables peer-to-peer communication of user equipment devices, or communication of user equipment devices in locations remote from each other (described in more detail below).

Memory (e.g., random-access memory, read-only memory, or any other suitable memory), hard drives, optical drives, or any other suitable fixed or removable storage devices (e.g., DVD recorder, CD recorder, video cassette recorder, or other suitable recording device) may be provided as storage 308 that is part of control circuitry 304. Storage 308 may include one or more of the above types of storage devices. For example, user equipment device 300 may include a hard drive for a DVR (sometimes called a personal video recorder, or PVR) and a DVD recorder as a secondary storage device. Storage 308 may be used to store various types of media described herein and guidance application data, including program information, guidance application settings, user preferences or profile information, or other data used in operating the guidance application. Nonvolatile memory may also be used (e.g., to launch a boot-up routine and other instructions).

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided.

Control circuitry 304 may also include scaler circuitry for upconverting and downconverting media into the preferred output format of the user equipment 300. Circuitry 304 may also include digital-to-analog converter circuitry and analog-to-digital converter circuitry for converting between digital and analog signals. The tuning and encoding circuitry may be used by the user equipment to receive and to display, to play, or to record media content. The tuning and encoding circuitry may also be used to receive guidance data. The circuitry described herein, including for example, the tuning, video generating, encoding, decoding, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may control the control circuitry 304 using user input interface 310. User input interface 310 may be any suitable user interface, such as a remote control, mouse, trackball, keypad, keyboard, touch screen, touch pad, stylus input, joystick, voice recognition interface, or other user input interfaces. Display 312 may be provided as a stand-alone device or integrated with other elements of user equipment device 300. Display 312 may be one or more of a monitor, a television, a liquid crystal display (LCD) for a mobile device, or any other suitable equipment for displaying visual images. In some embodiments, display 312 may be HDTV-capable. Speakers 314 may be provided as integrated with other elements of user equipment device 300 or may be stand-alone units. The audio component of videos and other media content displayed on display 312 may be played through speakers 314. In some embodiments, the audio may be distributed to a receiver (not shown), which processes and outputs the audio via speakers 314.

Figure 4:
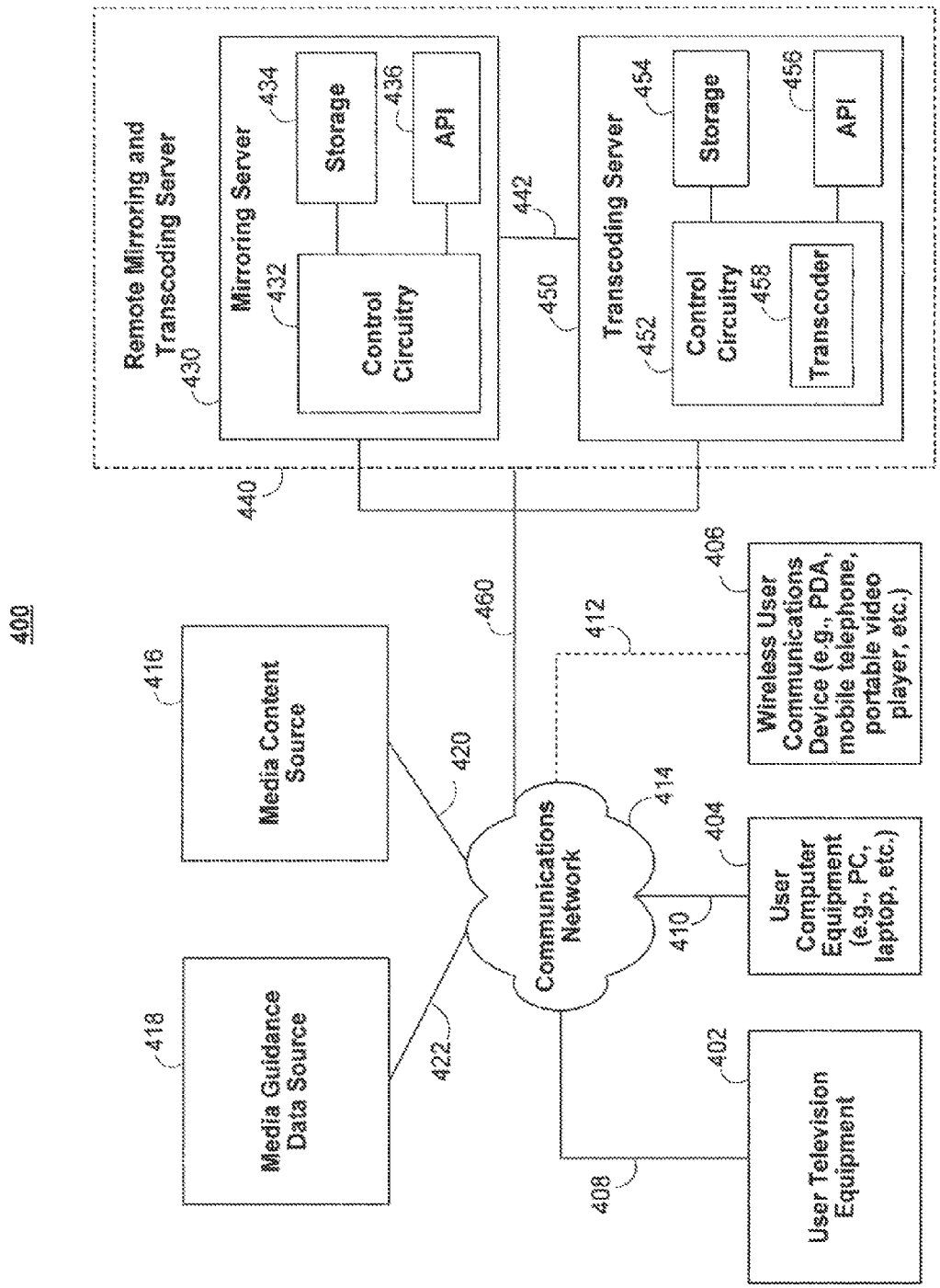
FIG. 4 is a diagram of an illustrative interactive media system for mirroring and providing access to mirrored media content in accordance with one embodiment of the invention.

User equipment device 300 of FIG. 3 can be implemented in system 400 of FIG. 4 as user television equipment 402, user computer equipment 404, wireless user communications device 406, or any other type of user equipment suitable for accessing media, such as a non-portable gaming machine. For simplicity, these devices may be referred to herein collectively as user equipment, user equipment devices, or user devices. User equipment devices, on which a media guidance application is implemented, may function as a standalone device or may be part of a network of devices. Various network configurations of devices may be implemented and are discussed in more detail below.

System 400 shown in FIG. 4 is an illustrative interactive media distribution system for providing access to media content in one aspect of the present invention. Exemplary system 400 includes media content source 416, media guidance data source 418, user equipment devices 402, 404, and 406, and remote mirroring and transcoding server 440 (which may include mirroring server 430 and transcoding server 450) as well as various communication networks and data links.

User television equipment 402 in system 400 may include a set-top box, an integrated receiver decoder (IRD) for handling satellite television, a television set, a digital storage device, a DVD recorder, a video-cassette recorder (VCR), a digital video recorder, a local media server, or other user television equipment. One or more of these devices may be integrated in a single device if desired. User computer equipment 404 may include a PC, a laptop, a tablet, a WebTV box, a personal computer television (PC/TV), a PC media server, a PC media center, or other user computer equipment. WEBTV is a trademark owned by Microsoft Corp. Wireless user communications device 406 may include PDAs, a mobile telephone, a portable video player, a portable music player, a portable gaming machine, an automobile television system, an enhanced passive device, or other wireless devices.

It should be understood that with the advent of television tuner cards for PC's, WebTV, and the integration of video into other user equipment devices, the lines have become blurred when trying to classify a device as one of the above devices. In fact, each of user television equipment 402, user computer equipment 404, and wireless user communications device 406 may utilize at least some of the system features described in FIG. 3 and, as a result, include flexibility with respect to the type of media content available on the device. For example, user television equipment 402 may be Internet-enabled, allowing for access to Internet content, while user computer equipment 404 may include a tuner allowing for access to television programming. The media guidance application may also have the same layout on the various different types of user equipment or may be tailored to the display capabilities of the user equipment. For example, on user computer equipment, the guidance application may be provided as a web site accessed by a web browser. In another example, the guidance application may be scaled down for wireless user communications devices. System 400 typically includes more than one of each type of user equipment device but only one of each is shown in FIG. 4 to avoid overcomplicating the drawing.

The user equipment devices may be coupled to communications network 414. Namely, user television equipment 402, user computer equipment 404, and wireless user communications device 406 are coupled to communications network 414 via communications paths 408, 410, and 412, respectively. Communications network 414 may be one or more networks including the Internet, a mobile telephone network, mobile device (e.g., Blackberry) network, cable network, public switched telephone network, or other types of communications networks or combinations of communications networks. BLACKBERRY is a service mark owned by Research In Motion Limited Corp. Paths 408, 410, and 412 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 412 is drawn with dotted lines to indicate that in the exemplary embodiment shown in FIG. 4 it is a wireless path and paths 408 and 410 are drawn as solid lines to indicate they are wired paths (although these paths may be wireless paths, if desired). Communications with the user equipment devices may be provided by one or more of these communications paths, but are shown as a single path in FIG. 4 to avoid overcomplicating the drawing.

Although communications paths are not drawn between user equipment devices, these devices may communicate directly or indirectly with each other via communication paths, such as those described above in connection with paths 408, 410, and 412, as well other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 414.

System 400 includes media content source 416 and media guidance data source 418 coupled to communications network 414 via communication paths 420 and 422, respectively. Paths 420 and 422 may include any of the communication paths described above in connection with paths 408, 410, and 412. Communications with media content source 416 and media guidance data source 418 may be exchanged over one or more communications paths, but are shown as a single path in FIG. 4 to avoid overcomplicating the drawing. In addition, there may be more than one of each of media content source 416 and media guidance data source 418, but only one of each is shown in FIG. 4 to avoid overcomplicating the drawing. (The different types of each of these sources are discussed below.) If desired, media content source 416 and media guidance data source 418 may be integrated as one source device. Although communications between sources 416 and 418 with user equipment devices 402, 404, and 406 are shown as through communications network 414, in some embodiments, sources 416 and 418 may communicate directly with user equipment devices 402, 404, and 406 via communication paths (not shown) such as those described above in connection with paths 408, 410, and 412.

Media content source 416 may include one or more types of media distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other media content providers. NBC is a trademark owned by the National Broadcasting Company, Inc., ABC is a trademark owned by the ABC, INC., and HBO is a trademark owned by the Home Box Office, Inc. Media content source 416 may be the originator of media content (e.g., a television broadcaster, a Webcast provider, etc.) or may not be the originator of media content (e.g., an on-demand media content provider, an Internet provider of video content of broadcast programs for downloading, etc.). Media content source 416 may include cable sources, satellite providers, on-demand providers, Internet providers, or other providers of media content. Media content source 416 may also include a remote media server used to store different types of media content (including video content selected by a user), in a location remote from any of the user equipment devices.

Media guidance data source 418 may provide media guidance data, such as media listings, media-related information (e.g., broadcast times, broadcast channels, media titles, media descriptions, ratings information (e.g., parental control ratings, critic's ratings, etc.), genre or category information, actor information, logo data for broadcasters' or providers' logos, etc.), media format (e.g., standard definition, high definition, etc.), advertisement information (e.g., text, images, media clips, etc.), on-demand information, and any other type of guidance data that is helpful for a user to navigate among and locate desired media selections.

Media guidance application data may be provided to the user equipment devices using any suitable approach. In some embodiments, the guidance application may be a stand-alone interactive television program guide that receives program guide data via a data feed (e.g., a continuous feed, trickle feed, or data in the vertical blanking interval of a channel). Program schedule data and other guidance data may be provided to the user equipment on a television channel sideband, in the vertical blanking interval of a television channel, using an in-band digital signal, using an out-of-band digital signal, or by any other suitable data transmission technique. Program schedule data and other guidance data may be provided to user equipment on multiple analog or digital television channels. Program schedule data and other guidance data may be provided to the user equipment with any suitable frequency (e.g., continuously, daily, a user-specified period of time, a system-specified period of time, in response to a request from user equipment, etc.). In some approaches, guidance data from media guidance data source 418 may be provided to users' equipment using a client-server approach. For example, a guidance application client residing on the user's equipment may initiate sessions with source 418 to obtain guidance data when needed. Media guidance data source 418 may provide user equipment devices 402, 404, and 406 the media guidance application itself or software updates for the media guidance application.

Media guidance applications may be, for example, stand-alone applications implemented on user equipment devices. In other embodiments, media guidance applications may be client-server applications where only the client resides on the user equipment device. For example, media guidance applications may be implemented partially as a client application on control circuitry 304 of user equipment device 300 and partially on a remote server as a server application (e.g., media guidance data source 418). The guidance application displays may be generated by the media guidance data source 418 and transmitted to the user equipment devices. The media guidance data source 418 may also transmit data for storage on the user equipment, which then generates the guidance application displays based on instructions processed by control circuitry.

System 400 may also include remote mirroring and transcoding server 440 used to mirror media content stored on any of user equipment devices 402, 404, or 406, in a location remote from any of the user equipment devices. Remote mirroring and transcoding server 440 may also be used provide the mirrored copies of the media content in the original or transcoded media content format to requesting devices. Media content that may be mirrored on remote mirroring and transcoding server 440 include, but is not limited to, videos, music, images, other audio content (e.g., voice messages), multi-media content, text, or other suitable media content. If necessary, the mirrored copy of the media content may include metadata associated with the media content. For example, in some embodiments, remote mirroring and transcoding server 440 may store metadata required to successfully play the mirrored copy of the media content on a requesting device. Examples of metadata that may be mirrored along with media content include, but are not limited to, subtitles, text tracks, music information tracks, additional video formats, additional languages, or other additional data. In some embodiments, remote mirroring and transcoding server 440 may be coupled to communications network 414 through communications path 460. Communications path 460 may be any suitable communications path such, as for example, those described in connection with communication path 420. Remote mirroring and transcoding server 440 may reside with media content source 416 but has been drawn as a separate element for clarity.

Remote mirroring and transcoding server 440 may include mirroring server 430 for mirroring media content, and transcoding server 450 for providing the mirrored media content to requesting devices in an original or transcoded format of the media content.

Mirroring server 430 may be based on any suitable combination of hardware and software capable of client-server based interactions with source devices such as, for example, user equipment devices 402, 404, or 406. In the simplified embodiment of FIG. 4, mirroring server 430 includes one or more control circuitry 432, storage 434, communications device (not shown), and application program interface (API) 436 (which may be an application run by control circuitry 432 and stored on storage 434, but has been drawn as a separate element for clarity). Mirroring server 430 may, for example, receive a mirroring request from any of user equipment devices 402, 404, or 406, process the request, create, and store a mirrored copy of the appropriate media content stored on the respective device. In some embodiments, mirroring server 430 may run a suitable database engine, such as a SQL server or Oracle DB, and provide the mirrored content based on queries executed by the database engine.

Control circuitry 432 of mirroring server 430 may include any suitable processor, such as a microprocessor or group of microprocessors, and other processing circuitry such as caching circuitry, direct memory access (DMA) circuitry, and input/output (I/O) circuitry. In some embodiments, control circuitry 432 may also include circuitry suitable for decoding program and data files stored on storage 434 and playing back mirrored copies of the media content on various types of user equipment devices in response to access requests.

Storage 434 of mirroring server 430 may include any suitable storage device including memory or other storage devices, such as random access memory (RAM), read only memory (ROM), flash memory, and a hard disk drive, that is suitable for storing mirrored copies of media content. Media content may be stored on storage 434 in any suitable format (e.g., a Structured Query Language (SQL) database). Storage 434 may also store user profile information for correlating users with their respective user equipment devices and mirrored content. Storage 434 may include several levels of primary, secondary, and auxiliary storage. For example, in some embodiments, the storage level for a mirrored copy of a given media content may be determined based on the frequency of access or other property of the mirrored content, such as the last date of access. In some embodiments, where multi-level storage is employed, the most recently accessed or most frequently accessed mirrored content may be stored in the primary level storage, which is typically the fastest memory level. Although storage 434 is shown in direct connection with control circuitry 432, in some embodiments, at least a portion of storage 434 may be located on a separate data server. For example, in some embodiments, a separate data server may be used for each type of media content (e.g., audio, video, image, text, etc.) mirrored on mirroring server 430.

The communications device (not shown) employed by mirroring server 430 may be any device suitable for communications between mirroring server 430, transcoding server 450, and communications network 414, such as a communication port (e.g., a serial port, parallel port, universal serial bus (USB) port, etc.), modem (e.g., any suitable analog or digital standard modem or cellular modem), network interface card (e.g., an Ethernet card, token ring card, etc.), wireless transceiver (e.g., an infrared, radio, or other suitable analog or digital transceiver), or other suitable communications device.

Media system 400 may include multiple mirroring servers 430, but only one is shown to avoid overcomplicating the drawing. For example, in some embodiments, the particular mirroring server 430 that stores a mirrored copy a given media content may be selected from multiple mirroring servers 430 based on the type of media content (e.g., video, audio, text, etc.) to be stored. In some embodiments, mirroring server 430 may be an application (e.g., a Web server application) resident on remote mirroring and transcoding server 440, rather than a physical server.

Remote mirroring and transcoding server 440 may also include transcoding server 450 coupled to mirroring server 430, user equipment devices 402, 404, and 406, and communications network 414 through communications path 460. In some embodiments, transcoding server 450 may also be in direct communication with mirroring server 430 through communications link 442.

Transcoding server 450 may provide media content mirrored on mirroring server 430 to a requesting device. In some embodiments, transcoding server 450 may provide the media content to be played on-demand by the requesting device in response to requests received from the requesting device to access the media content. In some embodiments, transcoding server 450 may also automatically provide the media content to designated devices selected by the user to receive such automatic updates. Whether the media content is provided by transcoding server 450 automatically or in response to a request, transcoding server 450 may provide the media content in an original or transcoded media content format based, for example, on the capabilities of the requesting or receiving device.

Transcoding server 450 may be based on any suitable combination of hardware and software (such as those described in connection with mirroring server 430) capable of client-server based interactions with requesting devices and, if necessary, server-server interactions with mirroring server 430. In the simplified embodiment of system 400, transcoding server 450 includes one or more control circuitry 452, storage 454, communications device (not shown), and application program interface (API) 456 (which may be an application run by control circuitry 452 and stored on storage 454, but has been drawn as a separate element for clarity). Control circuitry 452, storage 454, and API 456 may be based on any suitable hardware and/or software combination such as those described in connection with control circuitry 432, storage 434, and API 436, respectively, of mirroring server 430. In addition, control circuitry 452 may include logic for decoding various media content formats. For example, if the mirrored copy of the media content is stored as Moving Pictures Experts Group (MPEG) MPEG-2 files, control circuitry 452 may include an MPEG-2 decoder for decoding the media content and converting them to National Television Standards Committee (NTSC) video. Decoding for MPEG-4, H.264, and other suitable media formats may also be provided.

In some embodiments, transcoding server 450 may include logic for detecting or determining an appropriate media content format for a requesting device. For example, an appropriate media content format for a requesting device may be determined based on the storage, bandwidth, and/or display capabilities of the requesting device, or any other suitable format requirements or preferences associated with the requesting device or the user. Regardless of the mechanism used to determine an appropriate media content format for a requesting device, transcoding server 450 may transcode the mirrored copy of the media content into that media content format and provide the mirrored, transcoded copy of the media content to the requesting device. Control circuitry 452 of transcoding server 450 may include one or more transcoders 458 for transcoding a mirrored copy of the media content from a first format to a second format. Where control circuitry 452 includes multiple transcoders 458, transcoding server 450 may include circuitry or other suitable means (e.g., handlers) for selecting one or more transcoders for any given transcoding task, based, for example, on the media content type, input format of the mirrored copy, or output format for the requested media content. In some embodiments, transcoding server 450 may store the transcoded, mirrored copy of the media content on storage 454.

Media system 400 may include multiple transcoding servers 450, but only one is shown to avoid overcomplicating the drawing. In some embodiments, the particular transcoding server 450 that transcodes and delivers media content to a requesting device may be selected from multiple transcoding servers 450 based, for example, on the type of the media content (e.g., video, audio, text, etc.) to be transcoded. In some embodiments, transcoding server 450 may be an application (e.g., a Web server application) resident on remote mirroring and transcoding server 440, rather than a physical server. In some embodiments, transcoding server 450 and mirroring server 430 may be the same server, but are drawn as separate elements for clarity. In these embodiments, for example, the same remote server 440 (which may be one of multiple remote servers 440) may store mirrored copies of the media content, receive requests from a requesting device, and provide the mirrored copy in the original or transcoded format to the requesting devices. Transcoding server 450 and mirroring server 430 may also be respective applications (e.g., server applications) resident on remote mirroring and transcoding server 440. Systems and methods for remote storage of media content, and providing remotely stored media content to user equipment are discussed in greater detail in connection with Ellis et al., U.S. patent application Ser. No. 09/332,244, filed Jun. 11, 1999, which is hereby incorporated by reference herein in its entirety.

System 400 is intended to illustrate a number of approaches, or network configurations, by which user equipment devices and sources of media content and guidance data may communicate with each other for the purpose of accessing media and providing media guidance within a home network or over an external communication network. Interactive media system 400 may typically include more than one of each type of user equipment device. In addition, each user may utilize more than one type of user equipment device (e.g., a user may have a television set and a computer) and also more than one of each type of user equipment device (e.g., a user may have a PDA and a mobile telephone and/or multiple television sets). The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.tvguide.com on a remote device such as their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application. Systems and methods for maintaining consistent media guidance application settings on different user equipment devices within a home network, are described in greater detail in Ellis et al., U.S. patent application Ser. No. 11/179,410, filed Jul. 11, 2005, the disclosure of which is hereby incorporated herein by reference in its entirety.

In some embodiments, interactive media system 400 may include home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, are discussed in, for example, Ellis et al., U.S. patent application Ser. No. 10/927,814, filed Aug. 26, 2004, which is hereby incorporated by reference herein in its entirety.

Where a user or a group of users relies on multiple user equipment devices to access and share media content, the interactive media guidance application may allow users to mirror media content stored on the various devices on a remote server (e.g., remote mirroring and transcoding server 440 (FIG. 4) and access the mirrored copy of the media content using other user equipment devices in a transcoded or original format. A user may mirror one or more storage drives on any of the user's devices. Alternatively, the user may select a subset of media content on any storage drive for mirroring.

Figure 5:
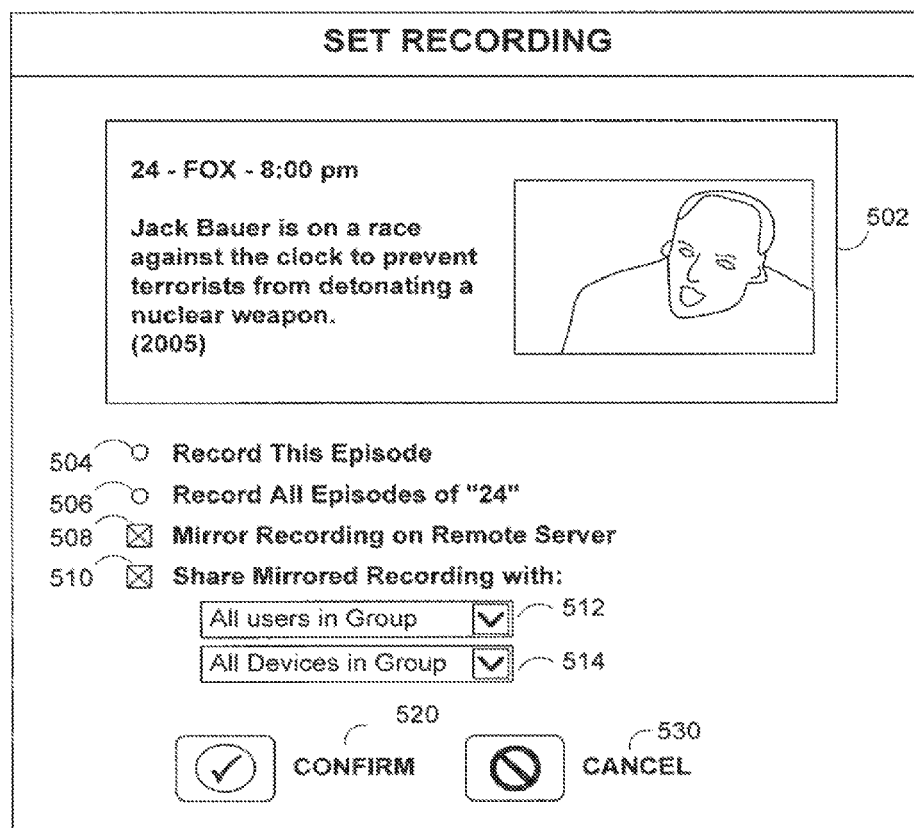
FIG. 5 shows illustrative display screen 500 for setting, mirroring, and sharing a recording of a television program with user equipment devices in accordance with one embodiment of the invention.

The general concept of selecting media content on a user equipment device to be mirrored on a remote server is illustrated with reference to the specific illustrative embodiment of setting up a recording of a television program for mirroring on the remote server in illustrative display screen 500 of FIG. 5. It should be understood that any type of media content (and not just television programs) may be designated to be mirrored by a remote server, such as, for example, mirroring server 430 (FIG. 4). Screen 500 may be accessed from any interactive media guidance application implemented on any of user equipment devices 402, 404, or 406 (all of FIG. 4) in response to a user indication to record a program from a program listings screen, such as, for example, screen 100 (FIG. 1). Illustrative screen 500 may include program information area 502, program recording options 504 and 506, mirroring option 508, sharing options 510, 512, and 514, and selectable controls 520 and 530. Screen 500 is only one type of screen that may be displayed to allow a user to record and mirror programs using the interactive media guidance application. Other screens may be displayed by the interactive media guidance application without departing from the scope of the invention. Using interactive media guidance applications to set recordings of television programs is discussed in greater detail in Ellis U.S. Patent Publication No. 2003/0149980, which is incorporated by reference herein in its entirety.

Program information area 502 may include any of text, graphics, and video information related to the selected program. For example, as shown in FIG. 5, program information area 502 includes the title, channel, time, and release year for the selected program. Program information area 502 may also include a summary and a representative graphic or video of the selected program.

The interactive media guidance application may allow the user to select program recording settings for the selected program. In response to the user selecting program recording setting 504, the interactive media guidance application may be configured to record the current episode of the selected program. In response to the user selecting program recording settings 506, the interactive media guidance application may be configured to record all future episodes of the selected program (e.g., set a series recording). Series recordings are discussed in greater detail in Knudson et al. U.S. Patent Publication No. 2005/0204388, which is hereby incorporated by reference herein in its entirety. Program recording options 504 and 506 are merely illustrative. Additional options may be included in screen 500 without departing from the scope of the present invention.

The interactive media guidance application may allow the user to set options for mirroring the recording on mirroring server 430 (FIG. 4) and sharing the mirrored recording with other users or devices associated with the user's mirroring account or group. For example, the user may select option 508 to designate the recording for mirroring by mirroring server 430 (FIG. 4). If option 508 is selected, the recording may be mirrored in accordance with a user-determined mirroring schedule or in response to new recordings being made for the selected program. The user may also select option 510 to configure access to the mirrored recording. In response to the user selecting shared mirrored recording option 510, the interactive media guidance application may allow other user equipment devices or users associated with or authorized by the user to access the mirrored recording on the mirroring server. For example, the user may authorize access to the recording by all or a subset of users associated with the user using selectable control 512. Alternatively or additionally, the user may authorize access to the recording by all or a subset of user devices associated with the user's account or group using selectable option 514. Although FIG. 5 shows the selection of a specific program recording for mirroring, mirroring may also be configured for one or more drives on the user equipment without designating specific programs.

Figure 6:
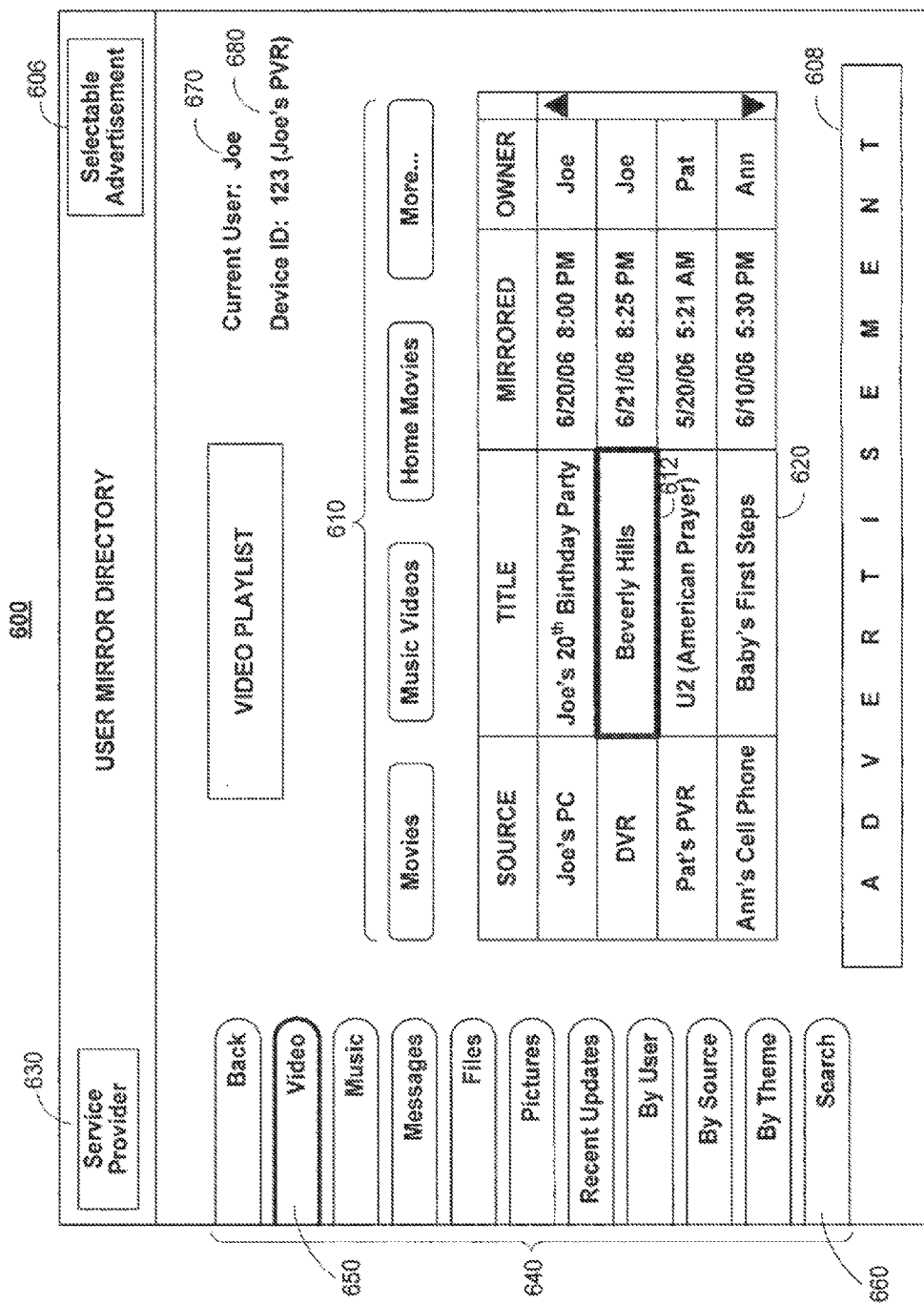
FIG. 6 shows illustrative screen 600 for accessing mirrored copies of the media content in accordance with one embodiment of the invention.

Mirrored copies of the media content may be accessed using any suitable approach. For example, FIG. 6 shows illustrative screen 600 for accessing mirrored copies of media content in accordance with one embodiment of the invention. It should be understood that any type of media content (and not just those shown in screen 600) may be mirrored on mirroring server 430 (FIG. 4). Screen 600 may be a part of any suitable interactive media application for remotely accessing media content and may be a displayed on any of user equipment devices 402, 404, or 406 (all of FIG. 4) in response to a user indication to view media content mirrored on mirroring server 430 (FIG. 4). Screen 600 may be accessed using any suitable approach. In one suitable approach, the user may access screen 600 using an interactive media guidance application which may include a selectable icon or link for accessing the mirrored content directory. In some embodiments, screen 600 may be displayed when the user, for example, presses a "DIR" key on a remote control or selects "User Directory" feature 220 of screen 200 of FIG. 2. Illustrative screen 600 may include display grid 620 including mirrored content entries 612, selectable features 640 and 610, banner advertisement 608, selectable advertisement 606, service provider information 630, user identification information 670, and device identification information 680. It should be understood that screen 600 is only one type of screen that may be displayed to allow a user to view mirrored copies of the media content using the interactive media guidance application. Other screens may be displayed by the interactive media guidance application without departing from the scope of the invention.

Selectable features 640 and 610 may selected by the user to customize or limit the media content entries displayed in display grid 620. For example, "Videos" feature 650 may be selected to limit the content in grid 620 to only video content. Alternatively or additionally, the user may limit the content of grid 620 by specifying a user-defined search using, for example, "Search" feature 660. In addition to restricting the content displayed in grid 620, the user may sort the content in grid 620. For example, the user may select "By Theme" feature 630, to sort the content of grid 620 according to various themes such as children's programs, sports, adult content, etc. The user may select any of the content entries in screen 600, such as for example, content entry 612, for playback on the requesting device. One or more of advertisements 606 or 608 may be selected and displayed based on user profile information or based on user selections in screen 600.

If desired, screen 600 may be displayed as an overlay or as a partial or full display screen. In some embodiments, the display mode for screen 600 may be selected based on the display, bandwidth, and/or storage capabilities of the user equipment device on which it is displayed. For example, screen 600 may be displayed as a partial screen when displayed on standard user devices such as installed television equipment, or as a full screen when displayed on a portable user device such as portable video player.

Figure 7:
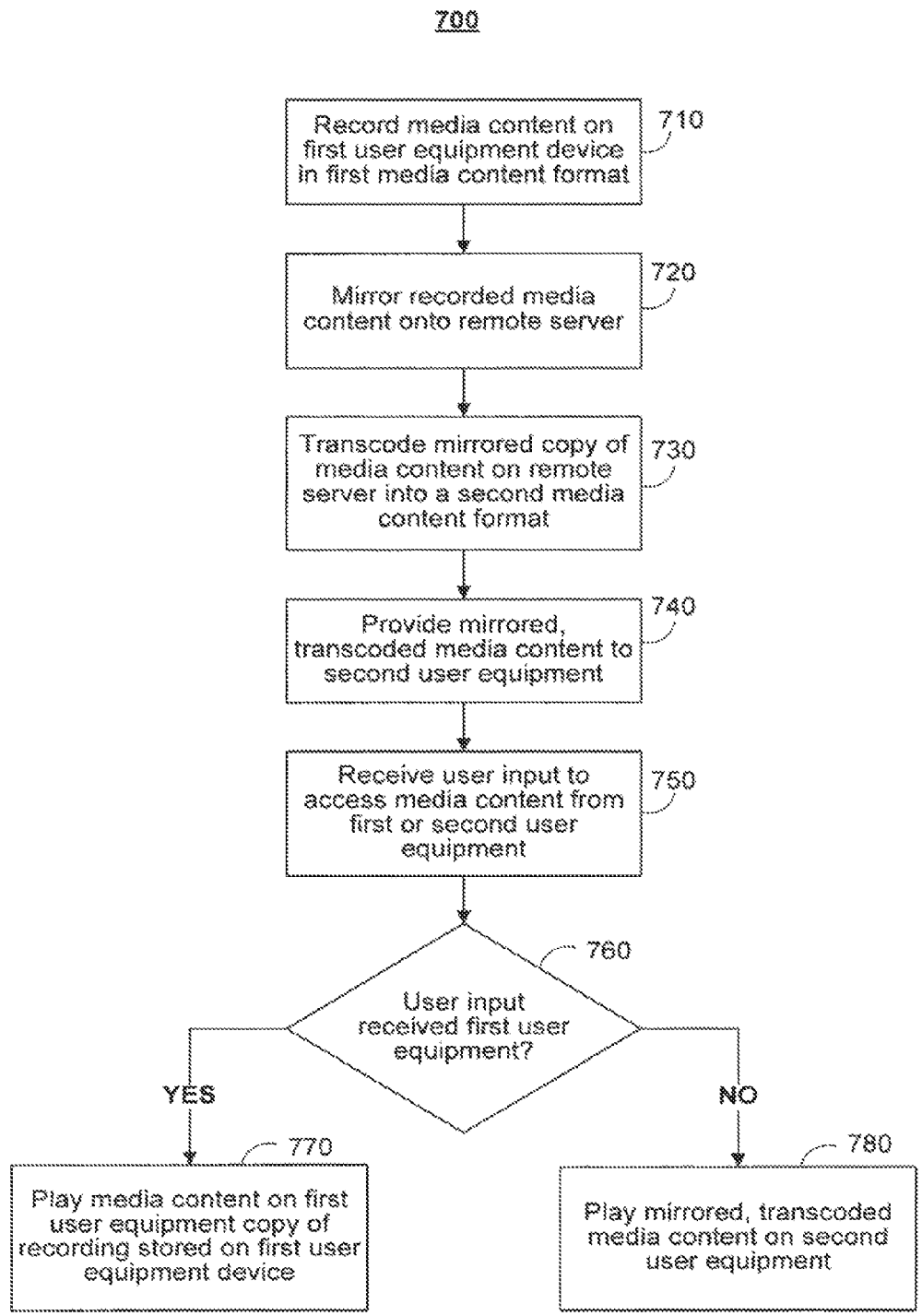
FIG. 7 show illustrative process 700 for mirroring and providing access to mirrored media content in accordance with one embodiment of the invention.

FIG. 7 shows illustrative process 700 which is a somewhat high level overview of a process for mirroring media content and providing access to a mirrored copy of the media content in accordance with some embodiments of the invention. At step 710, media content is stored or recorded on a first user equipment device. The first user equipment device, which represents the source device, may be any of user equipment devices 402, 404, or 406 (all of FIG. 4). At step 720, the recorded media content is mirrored onto a remote server. The mirrored copy of the media content may be stored on remote mirroring and transcoding server 440 (FIG. 4), or where separate mirroring and transcoding servers are used, on mirroring server 430 (FIG. 4). The remote server may be coupled to the source device over a network (e.g., communication path 460 (FIG. 4)). At step 730, the remote server transcodes a mirrored copy of the media content into a second media content format which may be provided to a second user equipment device at step 740. The second user equipment device, which represents the requesting device, may also be any of user equipment devices 402, 404, or 406 (all of FIG. 4). The media content may be transcoded and provided to the requesting device by remote mirroring and transcoding server 440 (FIG. 4), or where separate mirroring and transcoding servers are used, transcoding server 450 (FIG. 4). At step 750, a user input to access the media content is received by either the first user equipment (source device) or the second user equipment (a requesting device other than the source device). At step 760, a determination is made as to whether the user input was received by the first user equipment device or the second user equipment device. This determination may be made by remote mirroring and transcoding server 440 (FIG. 4) or, in some embodiments, by transcoding server 450 (FIG. 4). If the user input to access the media content was received by the first user equipment, the media content is played by the first user equipment from a local copy of the media content at step 760. Otherwise, a mirrored, transcoded copy of the media content (provided at step 740) is played on the second user equipment at step 780.

Figure 8:
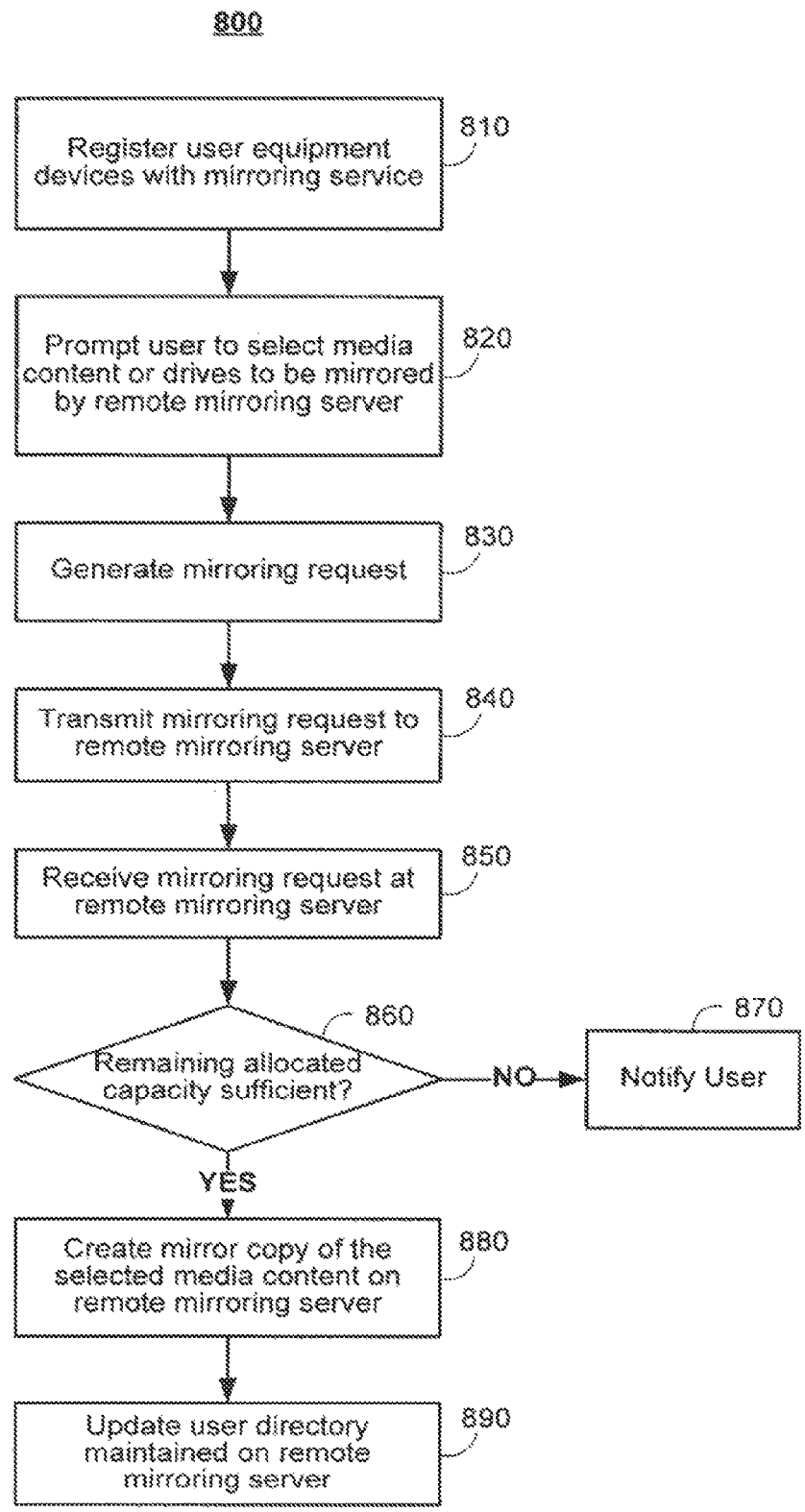
FIG. 8 shows illustrative process 800 for mirroring media content stored on a user equipment device onto a remote mirroring server according to one embodiment of the invention.
Figure 9:
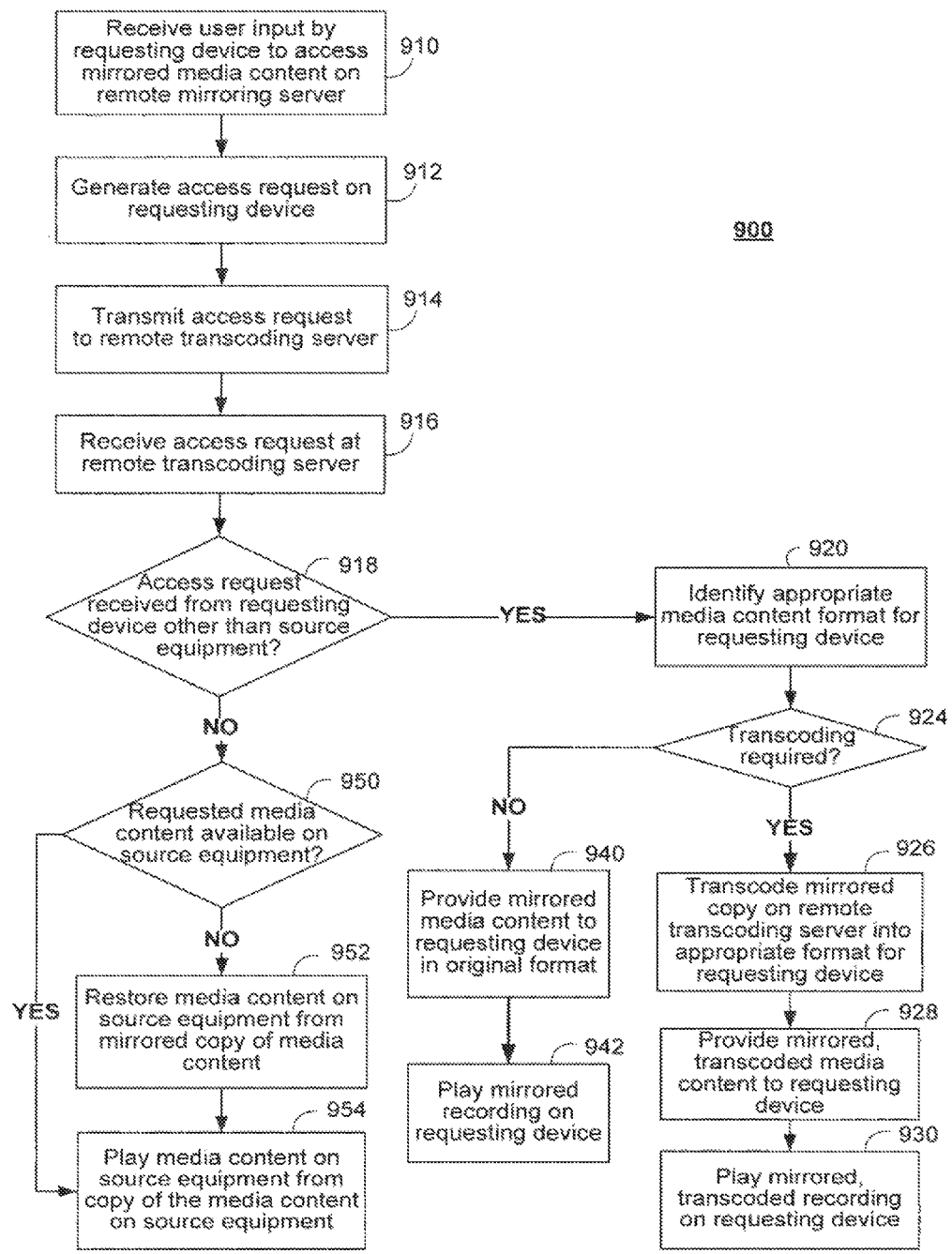
FIG. 9 shows illustrative process 900 for providing access to media content mirrored on a remote mirroring server according to one embodiment of the invention.

In practice, one or more steps shown in process 700 may be combined with other steps, performed in any suitable order, performed in parallel (e.g., simultaneously or substantially simultaneously) or removed. For example, in some embodiments, transcoding the media content (which occurs at step 730) and providing the media content (which occurs at step 740) may both be performed after step 760, in response to a user input to access the media recording received by a second user device that requires transcoding of the media content. FIGS. 8 and 9 show somewhat more detailed illustrative processes for mirroring media content on a remote server, and providing a mirrored copy of the media content from the remote server to various user equipment devices in a transcoded or original media content format. In the sections that follow, depending on the particular process step being described, reference may be made to mirroring server 430 (FIG. 4) or to transcoding server 450 (FIG. 4) for clarity. Regardless of the particular server referenced, it is understood that mirroring server 430 (FIG. 4) and transcoding server 450 (FIG. 4) may be combined into one server, such as, for example, remote mirroring and transcoding server 440 (FIG. 4).

FIG. 8 shows illustrative process 800 for mirroring media content stored on user equipment devices onto mirroring server 430 (FIG. 4) according to one embodiment of the invention. In some embodiments, prior to selecting or designating media content for mirroring, the user may configure the mirroring service. For example, at step 810, the user may subscribe to the mirroring service associated with mirroring server 430 (FIG. 4) and configure the service. The user may register all or a subset of the user's user equipment devices with the mirroring service. If desired, the user may select a predetermined maximum amount of storage to be allocated on mirroring server 430 (FIG. 4) for storing mirrored copies of the user's media content. In some embodiments, mirroring server 430 (FIG. 4) may simply allocate storage on an as-needed basis without first requiring the user to select a predetermined maximum storage allocation. In some embodiments, the user may also specify the mirroring schedule for the user equipment devices at step 810. For example, the user may choose to mirror media content on any of the user's devices based on a pre-determined schedule. The predetermined schedule may include specific dates and times, or may be on any periodic basis, such as, for example, monthly, weekly, daily, hourly, etc. Alternatively, in some embodiments, mirroring may be performed "live," in response updates to media content on the user device without relying on a predetermined schedule. In these embodiments, updates and additions to media content may be mirrored at any appropriate time without significantly interfering with other active tasks being performed on the user equipment. For example, mirroring may be triggered by the mirroring server when a predetermined minimum percentage of processing capacity is available on the user equipment device.

At step 820, the user may be prompted to select media content to be mirrored on mirroring server 430 (FIG. 4). Media content selected for mirroring may include content stored on any of user equipment devices 402, 404, or 406 (all of FIG. 4). In some embodiments, the user may mirror selected storage drives of the user equipment device. Alternatively, the user may choose to mirror a subset of the media content on the user equipment device. In some embodiments, a user may choose to mirror only certain types of media content. For example, a user may choose to mirror only MPEG-2, MPEG-4, or Windows media content. In these embodiments, mirroring server 430 (FIG. 4) may automatically mirror media content corresponding to the selected media content type or types as they are added or updated on the user equipment. The user may select media content or drives for mirroring using any appropriate interface. In some embodiments, an interactive media program may be provided to the user for selecting media content or drives for mirroring.

In some embodiments, users may also designate media content to be mirrored on mirroring server 430 (FIG. 4) by setting up search queries that define media content the user wants to mirror. The user may, for example, define Boolean expressions that result in mirroring media content that satisfy the criteria or criterion of the query. Suitable queries may include any parameters associated with the media content such as, for example, content titles, actors or musicians within video or audio content, themes or categories associated with the media content (e.g., sports, children's programming, drama, etc), text within content information fields, media content types (e.g., audio, video, etc.), format of the media content (e.g., MPEG-2, MPEG-4, etc.), or any other suitable parameters associated with the media content. The search query may be stored on the user equipment device or on mirroring server 430 (FIG. 4) to be used for future mirroring updates.

At step 830, a mirroring request is generated for content to be mirrored on mirroring server 430 (FIG. 4). The mirroring request may be generated concurrently with step 820, immediately after step 820, or sometime in the future after step 820, such as, in accordance with a pre-determined mirroring schedule. In generating the mirroring request, each selected media content may be assigned a content identifier. In addition, groups of media recordings selected or designated for mirroring may be assigned a grouping identifier. The mirroring request may also identify the source device, the user, the content type of the media content, the size of the media content, and other suitable information associated with the media content to be mirrored. In some embodiments, one mirroring request may be generated for multiple media content concurrently selected or designated for mirroring. In some embodiments, the mirroring request may include billing information for the user.

At step 840, the mirroring request is transmitted to mirroring server 430 (FIG. 4). The request may be transmitted from the source device to mirroring server 430 (FIG. 4) through communications path 460 (FIG. 4) using any suitable communications protocol or group of protocols. In some embodiments, the mirroring request may be transmitted using, for example, as an XML file.

At step 850, the mirroring request is received by mirroring server 430 (FIG. 4) from the source device. The received mirroring request may be processed to determine, for example, the user and source device associated with the request. In some embodiments, mirroring server 430 (FIG. 4) may store received mirroring requests for various purposes including, but not limited to, statistical analysis and debugging. The process continues to step 860.

At step 860, a determination is made whether the user has sufficient allocated storage capacity to store the media content. For example, information included in the mirroring request, such as, for example, the size of the media content, may be used by the mirroring server to determine whether the user has sufficient allocated storage capacity to store the media content. If the user does not have sufficient allocated storage capacity to store the media content, the user may be notified at step 870 and provided an opportunity to obtain more allocated storage capacity. In some embodiments, the mirroring server may automatically allocate extra storage capacity to the user and the user's account may be updated to reflect the new allocation. If the user has sufficient allocated storage capacity to store the media content or if the mirroring server allocates more capacity, the process proceeds to step 880.

At step 880, a mirrored copy of the media content and, if necessary, metadata associated with the media content, may be created on the mirroring server. In one embodiment, the mirroring server determines, based, for example, on various parameters included in the mirroring request, whether a mirror copy already exists for the media content. For example, the content identifier associated with the media content may be compared with content identifiers for other media content of the same type associated with the same user and source device to determine if a mirrored copy of the media content exists on mirroring server 430 (FIG. 4). If, for example, a mirrored copy already exists and the media content has been updated on the source device since the pre-existing mirrored copy was made, the pre-existing mirror copy may be updated. In some embodiments, rather than updating the pre-existing mirrored copy, a new version of the mirrored copy associated with the same content identifier may be created. The maximum number of versions associated with each content identifier may be a predetermined number set by the user or by the mirroring server. If it is determined that a mirrored copy of the media content does not already exist on the mirroring server, a new mirrored copy may be created and stored by mirroring server 430 (FIG. 4). In some embodiments, a data server or storage level for storing the mirrored copy of the media content may be determined based, for example, on information included in the mirroring request.

At step 890, a user directory (e.g., screen 600 of FIG. 6) maintained for mirrored copies of media content may be updated to reflect the newly-added or updated mirrored copies.

In practice, one or more steps shown in process 800 may be combined with other steps, performed in any suitable order, performed in parallel (e.g., simultaneously or substantially simultaneously) or removed. For example, the source device may determine, prior to generating a mirroring request, if the user has sufficient allocated storage capacity for the media content selected or designated for mirroring.

FIG. 9 shows illustrative process 900 for playing media content from mirroring server 430 (FIG. 4) in accordance with some embodiments of the invention. At step 910, a user input is received by a requesting device to access media content mirrored on mirroring server 430 (FIG. 4). The user may request access to media content on the mirroring server using any suitable requesting device. For example, any of user equipment devices 402, 404, and 406 (all of FIG. 4) may be used to access media content mirrored on the mirroring server. In some embodiments, the requesting device may include a client interface for displaying a directory of mirrored copies of media content on the mirroring server, such as, for example, screen 600 (FIG. 6). In some embodiments, the directory may be overlaid on top of a television program that the user is watching, may be overlaid on top of a program guide display screen, may be displayed within a dedicated program guide display screen such as the arrangement in FIG. 6, or may be displayed within a web page such as in the arrangement of FIG. 2. Alternatively, listings for mirrored copies of the media content may be presented to users in regular program listings screens such as shown in FIG. 1. In some embodiments, only media content to which the user or the requesting device has been granted access may be included in the directory of screen 600 displayed on the requesting device. For example, a user may grant access to all user devices associated with user's identifier on the mirroring server (e.g., all devices registered by the user in step 810 of FIG. 8). In some embodiments, access to media content may also be obtained through a communal account shared by a group of user equipment devices. In some embodiments, each user and/or user equipment device may have unique credentials (e.g., password and username) for accessing media content on mirroring server 430 (FIG. 4).

At step 912, an access request may be generated on the requesting device for the media content selected by the user at step 910. The access request may include, but is not limited to, a content identifier for the requested media content (which may be obtained from the selected entry in the mirrored media content directory), a device identifier for the requesting device, and if desired, a preferred output format for playing the requested media content.

At step 914, the access request may be transmitted from the requesting device to transcoding server 450 (FIG. 4), which may be the same as, or a different server from, mirroring server 430 (FIG. 4). The request may be transmitted from the requesting device directly to the transcoding server or may be routed through an intermediary device or server. At step 916, the access request is received by the transcoding server. The received access request may be processed to determine the user and/or requesting device associated with the request. In some embodiments, transcoding server 450 (FIG. 4) may store received access requests for various purposes including, but not limited to, statistical analysis and debugging. At step 918, based, for example, on information included in the access request, and/or directory information received from mirroring server 430 (FIG. 4), transcoding server 450 (FIG. 4) may determine whether the requesting device is a device other than the source device. If the requesting device is the source device, the process continues to step 950 (described below). Otherwise, the process continues to step 920.

At step 920, transcoding server 450 (FIG. 4) may identify an appropriate media content format for the requesting device. In some embodiments, an appropriate media content format may be included in the access request received from the requesting device. In some embodiments, the transcoding server may automatically determine an appropriate media content format for the requesting device based, for example, on the capabilities of the requesting device. For example, transcoding server 450 (FIG. 4) may select an appropriate media content format from a plurality of media content formats based on the capabilities of the requesting device. In some embodiments, an appropriate format for the requesting device may be selected based on any combination of the bandwidth, display, or storage capabilities of the requesting device.

The process continues to step 924 where the transcoding server may determine whether transcoding is required. For example, transcoding may be required if the media content format identified at step 920 is not the same as, equivalent to, or interchangeable with, the original format of the mirrored copy of the media content. If transcoding is not required, the process continues to step 940 (described below). Otherwise the process continues to step 926.

At step 926, a mirrored copy of the media content may be transcoded on transcoding server 450 (FIG. 4). In some embodiments, transcoding server 450 may obtain the mirrored copy of the media content from mirroring server 430 (FIG. 4) through direct link 442 (FIG. 4) prior to or in concurrence with transcoding. In some embodiments, transcoding on transcoding server 450 (FIG. 4) may occur prior to receiving a request for the media content from the requesting device (i.e., prior to step 916). In these embodiments, transcoding server 450 or mirroring server 430 (both of FIG. 4) may store the pre-transcoded copy of the mirrored media content to be provided in response to access requests. In some embodiments, the pre-transcoded media content may be automatically provided in media content updates to user devices designated to receive such automatic updates.

At step 928, the mirrored, transcoded copy of the media content is provided to the requesting device by transcoding server 450 (FIG. 4). The media content may be transmitted to the requesting device through communications path 460 (FIG. 4). In some embodiments, the mirrored, transcoded copy of the media content may be provided to the requesting device in segments based, for example, on the decoding rate and/or available storage capacity of the requesting device. The process continues to step 930.

At step 930, the mirrored, transcoded media content provided to the requesting device is played on the requesting device. The media content may be played on the requesting device remotely from transcoding server 450 (FIG. 4) or locally from a mirrored, transcoded copy provided by transcoding server 450 (FIG. 4) and cached or stored by the requesting device. Regardless of how the media content is played on the requesting device, the user may be provided with VCR-like control of the media content. For example, the media content may be played using an interactive media guidance application. The media guidance application may display an overlay or other indication to indicate to a user when the user has stopped, paused, rewound, or fast-forwarded the media content. If the media content is played on the requesting device remotely from transcoding server 450 (FIG. 4), the transcoding server may store a pointer within the mirrored and transcoded media content, which may be adjusted as the media content is played, fast-forwarded, rewound, or stopped, to keep track of the current playback location. In these embodiments, transcoding server 450 (FIG. 4) may use pointer information for the current program being played by the user to determine when the next media content requested by the user should be made ready for playback. For example, at a suitable point before a user pointer is adjusted beyond the beginning or end of the media content, the previous or next media content requested by the requesting device may be processed.

Returning now to step 924, if transcoding is not required by the requesting device (e.g., the requesting device is capable of playing the media content in the media content format of the mirrored copy, or the access requests specifies a media content format that is identical to, equivalent to, or interchangeable with, the media content format of the mirrored copy) the process continues to step 940. At step 940, the mirrored copy of the media content is provided to the requesting device in the original media content format of the mirrored copy. Where appropriate, the mechanisms described in relation to step 928 above for providing a transcoded copy of the media content to a requesting device may also be used to provide the mirrored copy of the media content, without transcoding, to the requesting device. The media content provided to the requesting device is played at the requesting device at step 942. Where appropriate, the mechanisms described above in relation to step 930 for playing a mirrored, transcoded copy of the media content on a requesting device may be used.

Returning now to step 918, if the requesting device is the source device, the process continues to step 950. In some embodiments, if desired, system 400 (FIG. 4) may be configured such that access requests from the source device, which are typically data recovery requests, are received and processed by mirroring server 430. At step 950, mirroring server 430 (FIG. 4) or transcoding server 450 (FIG. 4) may determine whether the requested media content is available on the source device. If the source device does not have the media content, the media content may be restored on the source device from the mirrored copy on mirroring server 430 (FIG. 4) at step 952. In some embodiments, the media content may be automatically restored in response to a user input to access the media content received by the source device and transmitted from the source device to the mirroring server. In other embodiments, the media content may be restored only in response to a user request to restore the media content (e.g., in response to a user response to an on-screen prompt at step 952). The process continues to step 954 where the media content is played on the source device from the copy of the media content that is stored (or restored) on the source device.

In practice, one or more steps shown in process 900 may be combined with other steps, performed in any suitable order, performed in parallel (e.g., simultaneously or substantially simultaneously) or removed. For example, in some embodiments, steps 926, 928, and 930 of process 900 may be combined or performed concurrently. In these embodiments, the transcoding, providing, and playback steps may be combined such that, a portion of the media content is played on the requesting device while the remaining portion is being transcoded and provided to the requesting device. In one suitable approach, the media content may be transcoded and played back by transcoding server 450 (FIG. 4) on the requesting device in real-time. If the media content is distributed as a digital data stream, the requesting device may decode the data stream in real-time. The media content may be distributed and played back according to preferences that were set up by the user. In a second suitable approach, the media content may be distributed as one or more digital files or as a digital data stream, and are stored by the requesting device for playback. In a third suitable approach, the media content may be played back by transcoding server 450 (FIG. 4) and distributed according to a schedule over an analog or digital channel using a suitable near-video-on-demand (NVOD) approach. Any combination of these approaches, or any other suitable approach, may also be used.

It will be appreciated that while the discussion of media content has focused on video content, the principles of media guidance can be applied to other types of media content, such as music, images, etc.

The above described embodiments of the present invention are presented for purposes of illustration and not of limitation, and the present invention is limited only by the claims which follow.

What is claimed is:

1. A method for providing access to media, the method comprising:
   receiving a user request to schedule media content for recording on first user equipment;
   in response to determining that recording of the media content scheduled for recording has been completed:
      determining whether the media content recorded on the first user equipment is of a type selected by a user;
      based on determining the media content recorded on the first user equipment is of the type selected, mirroring the media content recorded on the first user equipment on a remote server, coupled to the first user equipment over a network, to create a mirrored copy of the media content recorded on the first user equipment; and
      storing the mirrored copy of the media content on the remote server, wherein the mirrored copy of the media content includes a pointer to a playback position in the mirrored copy of the media content;
   determining a media content format that is appropriate for second user equipment;
   transcoding, on the remote server, the mirrored copy of the media content to the media content format that is appropriate for the second user equipment;
   automatically pushing the mirrored copy of the media content in the media content format that is appropriate for the second user equipment to the second user equipment; and
   updating the pointer stored on the remote server based on playback controls activated on the second user equipment.

2. The method of claim 1, wherein transcoding the mirrored copy of the media content comprises transcoding the mirrored copy of the media content before a user input is received from the second user equipment requesting to access the mirrored copy of the media content.

3. The method of claim 1, wherein automatically pushing the mirrored copy of the media content that is appropriate for the second user equipment occurs before receiving a user input from the second user equipment requesting to access the mirrored copy of the media content.

4. The method of claim 1, wherein the first user equipment is a mobile user device and the second user equipment is installed equipment.

5. The method of claim 1, further comprising periodically polling the first user equipment for updated media content.

6. The method of claim 1, further comprising automatically pushing the mirrored copy of the media content based on a user-determined schedule.

7. The method of claim 1, wherein the first user equipment is installed equipment and the second user equipment is a mobile user device.

8. The method of claim 1, wherein the first user equipment is in a home network, and the second user equipment is outside of the home network.

9. The method of claim 1, wherein one of the first user equipment and the second user equipment is a mobile user device selected from the group consisting of a cellular telephone, a laptop computer, a personal digital assistant, a handheld computer, a portable television system, an automobile television system, a portable media player, and any combination thereof.

10. The method of claim 1, wherein automatically pushing the mirrored copy of the media content to the second user equipment comprises:
determining whether the second user equipment is included in a list of previously registered user equipment devices; and
transmitting the mirrored copy of the media content to the second user equipment in response to determining that the second user equipment is included in the list of previously registered user equipment devices.

11. The method of claim 1, wherein one of the first user equipment and the second user equipment is user equipment selected from the group consisting of a personal computer, a set-top box, a digital video recorder, an optical disc recorder, a digital camera, a home telephone, a laptop computer, a personal digital assistant, a handheld computer, a media player, and any combination thereof.

12. The method of claim 1, wherein the first user equipment utilizes an interactive media guidance application to access the media content.

13. The method of claim 1, wherein the second user equipment utilizes an interactive media guidance application to access the mirrored copy of the media content.

14. The method of claim 1, wherein transcoding the mirrored copy of the media content by the remote server is performed in real-time.

15. The method of claim 1, further comprising receiving a user selection of the media content to be mirrored on the remote server.

16. The method of claim 15, wherein:
receiving a user selection of the media content to be mirrored on the remote server comprises receiving a user designation of a storage drive on the first user equipment; and
mirroring the media content recorded on the first user equipment comprises automatically mirroring the media content recorded on the designated storage drive.

17. The method of claim 15, wherein:
receiving a user selection of the media content to be mirrored on the remote server comprises receiving a user designation of a media content format; and
mirroring the media content recorded on the first user equipment comprises automatically mirroring the media content recorded in the designated media content format on the first user equipment.

18. The method of claim 1, wherein the media content is a television program series recorded on the first user equipment.

19. The method of claim 1, wherein the first user equipment is a set-top box.

20. The method of claim 1, wherein the mirrored copy of the media content is stored on the remote server before a user input is received by the second user equipment to access the mirrored copy of the media content.

21. A method for providing access to media to a mobile user device, the method comprising:
receiving a user request to schedule media content for recording on user equipment in a home network;
in response to determining that recording of the media content scheduled for recording has been completed, receiving, at a remote server, media content recorded in a first format on the user equipment, wherein the remote server is outside of the home network, and wherein the media content recorded is of a type selected by a user;
generating a mirrored copy of the media content on the remote server based on determining the media content is of the type selected;
storing the mirrored copy of the media content on the remote server, wherein the mirrored copy of the media content includes a pointer to a playback position in the mirrored copy of the media content;
determining a second media content format that is appropriate for the mobile user device;
transcoding, at the remote server, the mirrored copy into the second media content format that is appropriate for the mobile user device;
automatically pushing the mirrored copy of the media content in the second format to the mobile user device; and
updating the pointer stored on the remote server based on playback controls activated on the mobile user device.

22. The method of claim 21, further comprising selecting the second format from a plurality of formats based on capabilities of the mobile user device.

23. The method of claim 21, wherein transcoding the mirrored copy of the media content comprises transcoding the mirrored copy when the media content is stored in the first format on user equipment in the home network.

24. The method of claim 21, wherein transcoding the mirrored copy of the media content comprises transcoding the mirrored copy of the media content before a request for the mirrored copy of the media content is received from the mobile user device.

25. The method of claim 21, further comprising storing the transcoded, mirrored copy of the media content on the mobile user device.

26. The method of claim 21, wherein the remote server is a first remote server, and wherein:
transcoding the mirrored copy of the media content comprises transcoding the mirrored copy of the media content on a second remote server; and automatically pushing the mirrored copy of the media content to the mobile device comprises automatically pushing the mirrored copy of the media content from the second remote server to the mobile user device.

27. The method of claim 21, wherein the mobile user device is outside of the home network.

28. The method of claim 21, wherein the mobile user device is selected from the group consisting of a cellular telephone, a laptop computer, a personal digital assistant, a handheld computer, a portable television system, an automobile television system, a portable media player, and any combination thereof.

29. The method of claim 21, wherein automatically pushing the mirrored copy of the media content to the mobile device comprises:
    determining whether the mobile device is included in a list of previously registered user equipment devices; and
    transmitting the mirrored copy of the media content to the mobile device in response to determining that the mobile device is included in the list of previously registered user equipment devices.

30. The method of claim 21, wherein the user equipment is selected from the group consisting of a personal computer, a set-top box, a digital video recorder, an optical disc recorder, a digital camera, a home telephone, a laptop computer, a personal digital assistant, a handheld computer, a media player, and any combination thereof.

31. The method of claim 21, wherein the remote server comprises a first application resident on the remote server and a second application resident on the remote server, and wherein:
    generating the mirrored copy of the media content comprises receiving the mirrored copy of the media content from the first application; and
    transcoding the mirrored copy of the media content comprises transcoding the mirrored copy of the media content on the second application.

32. The method of claim 21, wherein the remote server is coupled to the user equipment over a network.

33. The method of claim 32, wherein mirroring the media content stored on the user equipment comprises periodically polling the user equipment for updated media content.

34. The method of claim 32, wherein the mirrored copy of the media content is generated according to a user-determined schedule.

35. The method of claim 34, further comprising receiving a user selection of the user-determined schedule from an interactive media guidance application.

36. The method of claim 21, further comprising playing back the mirrored copy of the media content in real-time.

37. The method of claim 36, further comprising receiving a request for the media content from the user equipment only if the media content is no longer stored on the user equipment.

38. The method of claim 21, wherein the mobile user device utilizes an interactive media guidance application to access the mirrored copy of the media content.

39. The method of claim 21, wherein the user equipment utilizes an interactive media guidance application to access the media content.

40. The method of claim 21, wherein transcoding the mirrored copy of the media content into the second format is performed in real-time.

41. The method of claim 21, wherein the media content is a television program series recording.

42. A system for providing access to media, the system comprising:
    a processor configured to:
        receive a user request to schedule media content for recording on first user equipment;
        in response to determining that recording of the media content scheduled for recording has been completed:
            determine whether the media content recorded on the first user equipment is of a type selected by a user;
            mirror the media content recorded on the first user equipment on a remote server, coupled to the first user equipment over a network, to create a mirrored copy of the media content recorded on the first user equipment based on determining the media content recorded on the first user equipment is of the selected type; and
            cause the mirrored copy of the media content to be stored on the remote server, wherein the mirrored copy of the media content includes a pointer to a playback position in the mirrored copy of the media content;
    wherein the remote server is configured to:
        determine a media content format that is appropriate for second user equipment;
        transcode on the remote server the mirrored copy of the media content to the media content format that is appropriate for the second user equipment;
        automatically push the mirrored copy of the media content in the media content format that is appropriate for the second user equipment to the second user equipment; and
        update the pointer stored on the remote server based on playback controls activated on the second user equipment.

43. The system of claim 42, wherein the remote server is configured to transcode the mirrored copy of the media content before a user requests access to the mirrored copy of the media content.

44. The system of claim 42, wherein the remote server is configured to automatically push the mirrored copy of the media content to the second user equipment in response to determining that the second user equipment is included in a list of previously registered user equipment devices.

45. A system for providing access to media to a mobile user device, the system comprising:
    a processor configured to:
        in response to a determination being made that recording of media content scheduled for recording has been completed on user equipment, receive, at a remote server, the media content recorded in a first format on the user equipment in a home network, wherein the remote server is outside of the home network, and wherein the media content recorded is of a type selected by a user;
        generate, at the remote server, a mirrored copy of the media content based on determining the media content is of the selected type;
        store the mirrored copy of the media content on the remote server, wherein the mirrored copy of the media content includes a pointer to a playback position in the mirrored copy of the media content;
        determining a second format of the media content that is appropriate for the mobile user device;
        transcode the mirrored copy of the media content into the second format of the media content that is appropriate for the mobile user device;

automatically push the mirrored copy of the media content in the second format to the mobile user device; and update the pointer stored on the remote server based on playback controls activated on the mobile user device.

46. The system of claim 45, wherein the processor is further configured to select the second format of the media content from a plurality of formats based on capabilities of the mobile user device.

47. The system of claim 45, wherein the processor is configured to automatically push the mirrored copy of the media content to the mobile user device in response to determining that the mobile user device is included in a list of previously registered user equipment devices.

48. The system of claim 42, wherein the mirrored copy of the media content is stored on the remote server before a user input is received by the second user equipment to access the mirrored copy of the media content.

* * * * *